US006832729B1

(12) United States Patent
Perry et al.

(10) Patent No.: US 6,832,729 B1
(45) Date of Patent: Dec. 21, 2004

(54) PORTABLE DATA COLLECTION DEVICE FOR READING FLUORESCENT INDICIA

(75) Inventors: Richard A. Perry, East Greenwich, RI (US); Michael J. Natalizia, Narragansett, RI (US); Roy P. Lyman, Coventry, RI (US); Richard J. Preliasco, North Kingstown, RI (US); Steven F. Petteruti, East Greenwich, RI (US)

(73) Assignee: ZIH Corp., Hamilton (BM)

( * ) Notice: Subject to any disclaimer, the term of this patent is extended or adjusted under 35 U.S.C. 154(b) by 0 days.

(21) Appl. No.: 10/103,900

(22) Filed: Mar. 22, 2002

Related U.S. Application Data

(60) Provisional application No. 60/278,179, filed on Mar. 23, 2001.

(51) Int. Cl.[7] .................................................. G06K 7/10

(52) U.S. Cl. ........................... 235/472.01; 235/462.45; 235/491

(58) Field of Search ........................... 235/472.01, 454, 235/462.01, 462.09, 462.45, 491

(56) References Cited

U.S. PATENT DOCUMENTS

| | | | | |
|---|---|---|---|---|
| 3,662,181 A | | 5/1972 | Hercher et al. | |
| 4,180,204 A | * | 12/1979 | Koenig et al. | 235/385 |
| 4,488,679 A | | 12/1984 | Bockholt et al. | |
| 4,689,480 A | * | 8/1987 | Stern | 250/201 |
| 5,331,140 A | | 7/1994 | Stephany | |
| 5,410,141 A | * | 4/1995 | Koenck et al. | 235/472.01 |
| 5,414,251 A | | 5/1995 | Durbin | |
| 5,442,167 A | * | 8/1995 | Cornelius et al. | 250/201.2 |
| 5,532,104 A | | 7/1996 | Goto | |
| 5,591,952 A | | 1/1997 | Krichever et al. | |
| 5,668,363 A | | 9/1997 | Nishida et al. | |
| 5,714,745 A | | 2/1998 | Ju et al. | |
| 5,773,810 A | * | 6/1998 | Hussey et al. | 235/472.01 |
| 5,834,754 A | | 11/1998 | Feng et al. | |
| 5,869,828 A | | 2/1999 | Braginsky | |
| 5,892,971 A | | 4/1999 | Danielson et al. | |
| 5,958,541 A | | 9/1999 | Miller et al. | |
| 5,959,296 A | | 9/1999 | Cyr et al. | |
| 6,006,991 A | | 12/1999 | Faklis et al. | |
| 6,062,475 A | | 5/2000 | Feng | |
| 6,123,263 A | | 9/2000 | Feng | |
| 6,184,534 B1 | | 2/2001 | Stephany et al. | |
| 6,292,595 B1 | | 9/2001 | Petteruti et al. | |
| 6,330,975 B1 | * | 12/2001 | Bunte et al. | 235/472.01 |
| 6,347,163 B2 | * | 2/2002 | Roustaei | 235/462.42 |

* cited by examiner

*Primary Examiner*—Daniel St. Cyr
(74) *Attorney, Agent, or Firm*—Alston & Bird LLP

(57) ABSTRACT

A portable data collection device is provided for reading fluorescent indicia, such as barcodes. The device includes a housing with a pivotable image capture module. The image capture module includes an adjustable aperture, a color detector array for imaging light received through the aperture, and a removable flash module to provide ultraviolet light. Optics in the image capture module focus the light received through the aperture onto the detector array, in which the detector array is movable with respect to the lens to provide proper focus of an image onto the detector array. The adjustable aperture has an iris wheel to control the amount of light received by the detector array. A programmed controller is provided in the housing which operates responsive to a user interface to image and decode indicia, or capture color digital images in memory. A display on the housing shows images received by the detector array in a non-fluorescent imaging mode to target indicia to be imaged and decoded, where the controller automatically adjusts the focus of the image by adjusting the focal distance between the detector array and the lens. In response to user actuation via the user interface, the controller energizes the flash module to emit light, including the excitation wavelength(s), which enable the indicia to fluoresce, and the detector array receives fluorescent light to capture an image frame of the indicia. The duration of the flash is in accordance with the amount of light measured by a light sensor in the image capture module. The indicia in the image frame is then decoded by the controller to provide data representative of the indicia.

26 Claims, 19 Drawing Sheets

231

PORTABLE DATA COLLECTION DEVICE FOR READING FLUORESCENT INDICIA

This application claims the benefit of priority to U.S. Provisional Patent Application No. 60/278,179, filed Mar. 23, 2001, which is herein incorporated by reference.

DESCRIPTION

1. Field of the Invention

The present invention relates to a portable data collection device (and method) for reading fluorescent indicia, and particularly to, a portable data collection device having a fluorescent imaging mode for reading media bearing fluorescent indicia, and a non-fluorescent imaging mode for capturing digital color images and aiming the device at indicia. The device in non-fluorescent imaging mode is also capable of operating as a digital camera for displaying and storing captured digital images, and for reading of non-fluorescent indicia.

2. Background of the Invention

Portable data collection devices are widely used in factories, warehouses, package delivery services, and retail stores for reading information such as barcodes on media, such as packages for inventory control, tracking, or production control. These collection devices use scanners or readers often having a CCD array for capturing an image and processing either one or two-dimensional barcodes in visible light. Examples of the use of a CCD array in a barcode reader are shown in U.S. Pat. Nos. 5,892,971, 5,414,251, and 5,591,952.

Recently, barcodes and other indicia are being used which are of an ink that fluoresces when illuminated by radiation having a particular excitation wavelength or range of excitation wavelengths, such as light in the ultraviolet spectrum. Barcodes that fluoresce are referred herein as fluorescent barcodes. Fluorescent particles may also be embedded in media, such as currency, stock certificates, or bank notes for security purposes. When the fluorescent ink is illuminated at the excitation wavelength, the ink emits light or radiation of a different fluorescence wavelength. For example, the United States Postal Service using identification tag bar code on mail using ink that fluoresces when illuminated by radiation in the ultraviolet range of the electromagnetic spectrum. To read fluorescent barcodes or other indicia, it is necessary to have a reader that can image a pattern of fluorescent illumination emitted by such indicia. In some circumstances, reading may be provided by measuring the amount of fluorescent illumination emitted from a density of fluorescent particles in media. Typical CCD based barcode readers are not capable of imaging fluorescent barcodes as they lack capability of illumination in the excitation wavelength required for imaging light at a fluorescent wavelength.

U.S. Pat. No. 6,123,263 describes a portable dataform reader for reading fluorescent dataforms, such as barcodes. The reader includes an illumination assembly having a flash tube strobing illumination source focused through an ultraviolet light filter for strobing ultraviolet light. A CCD array in the reader has an exposure time matched to the energization time of the flash tube strobing to capture image frames of fluorescent light of a dataform. Circuitry in the reader provides for decoding of the gray scale values of captured image frames, until the dataform is successfully decoded. Multiple strobing cycles are used to provide multiple captured image frames until a frame having a dataform is successful decoded. Each captured image of the dataform represents a "negative" of the dataform pattern. The processing of a captured image uses a binarizaion algorithm to identify binary values corresponding to the imaged dataform. The device uses visible light targeting LEDs to generate a cross-hair. The targeting LEDs are alternatively energized with the flash tube strobing illumination to avoid image distortion in captured images.

The dataform reader of U.S. Pat. No. 6,123,263 is limited to the capture of fluorescent dataforms using a gray scale CCD and does not provide for color digital imaging such as on a display, like a typical digital color camera, or storage of color digital images. Further, no mechanism is provided for automatically focusing an imaged dataform on the CCD of the reader, as the distance between the CCD and optics are fixed, thereby providing a limited range where the best focus of a dataform image will occur by such optics. The ability of the reader to capture a dataform with sufficient sharpness for decoding when the dataform image would be hindered if the image were not in focus on the CCD. Further, high usage of a flash strobe tube in work environments will cause the flash strobe tube to have a short lifetime, thus necessitating frequent replacement. However, replacement of the flash tube is made difficult due to it being located within the dataform reader. Thus, replacement of the flash tube cannot readily be performed and requires a skilled technician. Further, the duration of ultraviolet light illumination for each capture image cycle is fixed, and not adjustable in response to the amount of received light, which can negatively effect the quality of images on the CCD.

Other portable devices may use pulsed light to read fluorescent indicia, such as described in U.S. Pat. No. 6,184,534, which uses light emitting diodes (LEDs) to generate light that produces fluorescent emission from indicia and images the indicia on a CCD array.

Although typical digital cameras provide for capturing images for display and storage in memory, they do not have indicia decoding technology, or have the ability to provide for illumination and decoding fluorescent indicia.

SUMMARY OF THE INVENTION

Accordingly, it is the principal object of the present invention to provide an improved portable data collection device for reading fluorescent indicia that overcomes the drawbacks of the prior art.

It is another object of the present invention to provide an improved portable data collection device for reading fluorescent indicia with a single flash of light having sufficient illumination.

It is still another object of the present invention to provide an improved portable data collection device having a fluorescent imaging mode for reading media bearing fluorescent barcodes or patterns, and a non-fluorescent imaging mode for capturing digital color images and displaying, transmitting, and/or storing images in memory.

It is a further object of the present invention to provide an improved portable data collection device for reading fluorescent indicia having an automatic focusing mechanism.

It is still a further object of the present invention to provide an improved portable data collection device for reading fluorescent indicia which has a replaceable flash module.

Another object of the present invention is to provide an improved portable data collection device for reading fluorescent indicia having an image capture module mounted for pivotal movement.

It is a further object of the present invention to provide an improved portable data collection device for reading fluorescent indicia having multiple white light sources for providing illumination needed for automatic focusing to allow imaging in dim ambient light.

Yet a further object of the present invention is to provide an improved portable data collection device for reading fluorescent indicia which has laser sources for targeting the device for imaging indicia without effecting the quality of images.

A still further object of the present invention is to provide an improved portable data collection device capable of audio sound recording and playback, and a touch screen display for user interface.

It is a further object of the present invention to provide an improved portable data collection device for reading fluorescent indicia having a pivotable image capture module and a user replaceable flash module in the image capture module which has circuitry to enable safe handling if the flash module is charged (or partially charged) when removed.

Briefly described, a portable data collection device embodying the invention includes a housing having a pivotable image capture module. The image capture module includes an adjustable aperture and at least one detector array, such as a color CCD array, for imaging light received through the aperture, and a removable flash module capable of providing light in the excitation wavelength(s) of indicia. Optics, such as a lens, in the image capture module focus light received through the aperture onto the detector array, in which the detector array is mounted in a focusing mechanism which is capable of moving the detector array with respect to the optics to adjust the focus of an image onto the detector array. In the adjustable aperture is an iris wheel having multiple selectable positions of openings of different diameters or a light block in the path of the light to the detector array. A light sensor or photocell, such as a photodiode, coupled to an integrator, in the image capture module measures the amount of ambient light. A programmed controller, such as a microprocessor, is provided in the housing which operates responsive to a user interface, such as buttons, keys, or a touch screen, to capture images and decode imaged indicia or capture color digital images in the memory of the device. A display on the housing shows images received by the detector array in a non-fluorescent imaging mode to target indicia to be imaged and decoded, where the controller provides automatic focus by processing images received by the detector array to detect when the image is in focus and controls the focus mechanism to change the focal distance between the detector array and the lens until a focused (sharp) image is detected. In response to user actuation via the user interface, the controller energizes the flash module to emit light, including the excitation wavelength(s) to enable the indicia to fluoresce, and the detector array receives fluorescent light to capture an image frame of the indicia. Auto exposure circuitry determines the duration of light from the flash module in accordance with the amount of ambient light measured by the light sensor. The indicia captured in the image frame is decoded by the controller to provide data representative of the indicia. The user or controller may set the iris wheel in non-fluorescent imaging mode to provide a proper amount of light received by the detector array. The iris wheel of the adjustable aperture may have in one of the openings an optional filter to pass light of fluoresced (spectra) wavelength(s) of the fluoresced indicia, in which during fluorescent imaging, the iris wheel is positioned such that light is received through the filter.

Multiple white light sources, such as LEDs, may be provided on the image capture module to provide light needed for automatic focusing and target illumination in low ambient light. Further, two laser sources may be provided on the image capture module to emit light to enable targeting of the image capture module with respect to indicia. Such laser sources may be used when the display is not used for targeting the image capture module.

The controller operates in response to an application program stored in memory in the housing. A host computer can communicate with the device, such as to receive decoded indicia or to replace the application program with a different program to enable different functionality of the device.

The term indicia referred to herein are one or two-dimensional barcodes, patterns, or other graphics, characters or symbols.

BRIEF DESCRIPTION OF THE DRAWINGS

The foregoing objects, features and advantages of the invention will become more apparent from a reading of the following description in connection with the accompanying drawings, in which:

FIG. 8 shows the a block diagram of the control circuitry of the device, FIG. 9 shows a block diagram of the image capture module, and FIG. 10 shows a block diagram of the user interface of the device;

DETAILED DESCRIPTION OF THE INVENTION

Figure 1:
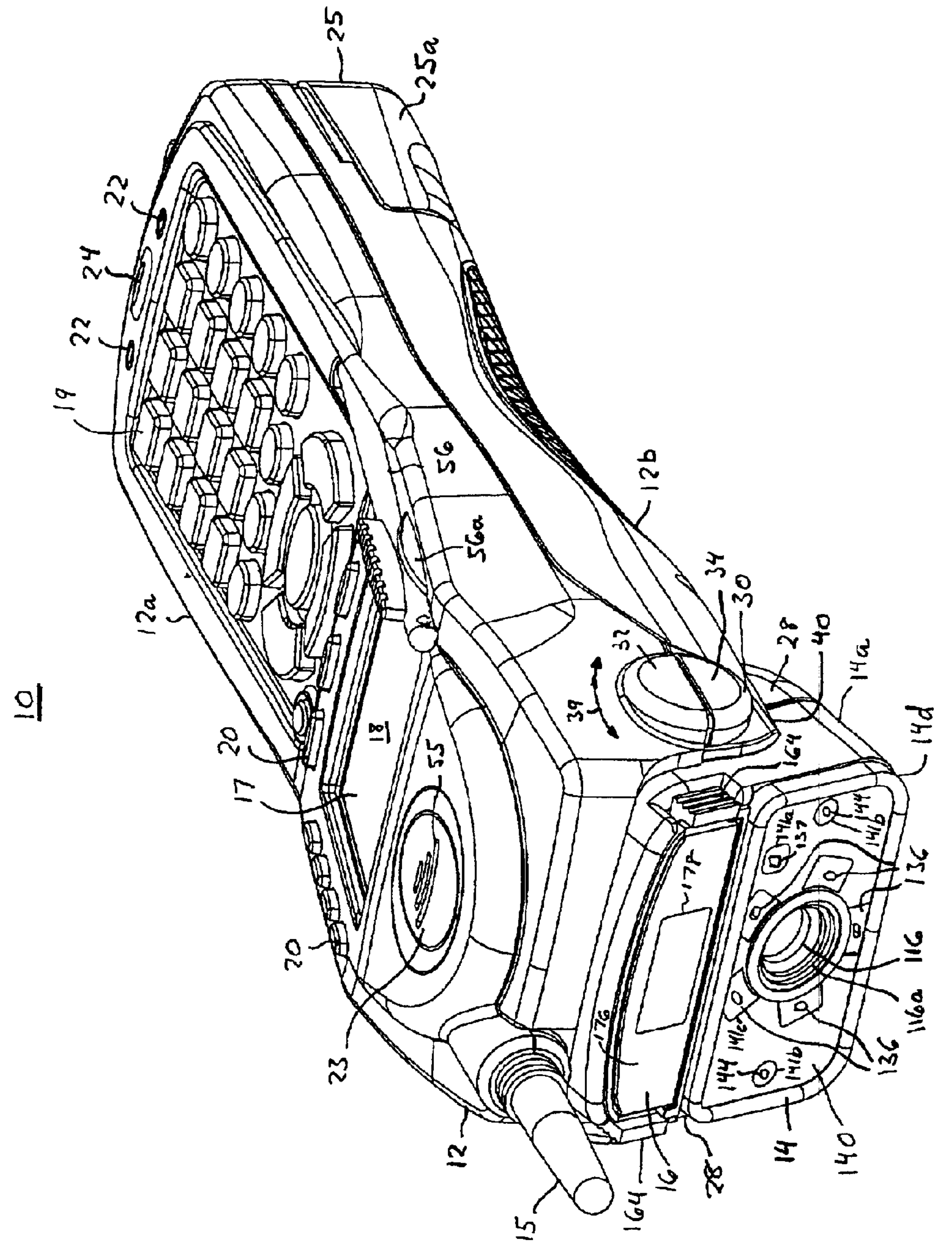
FIG. 1 is a perspective view of the portable data collection device in accordance with the present invention in which the image capture module is shown pivoted at an angle with respect to the housing of the device.
Figure 2:
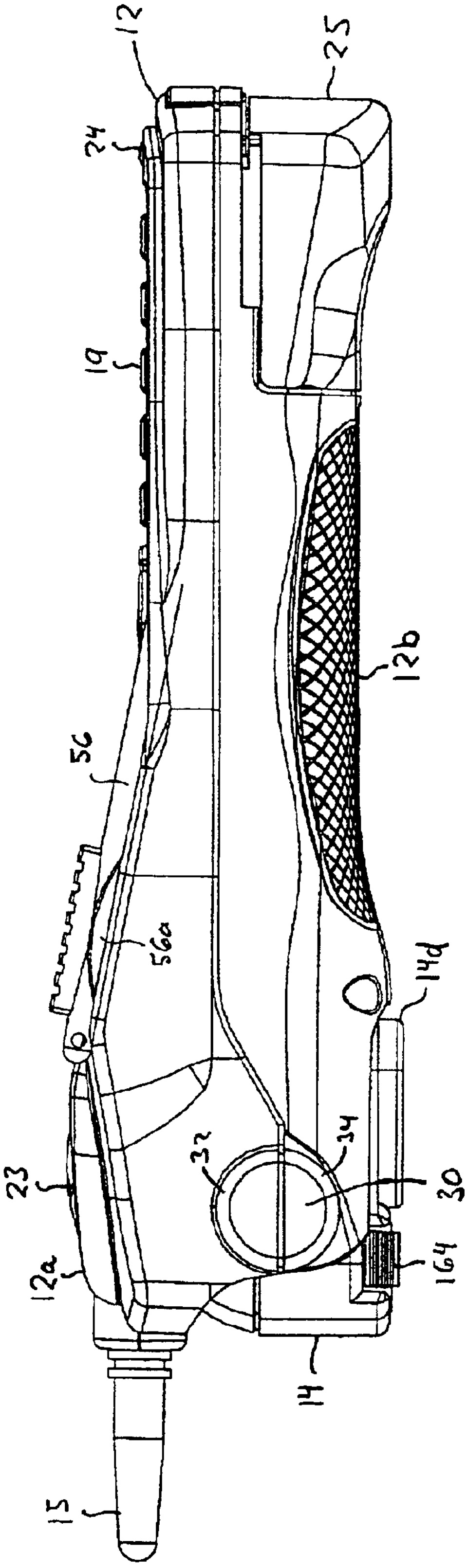
FIG. 2 is a side view of the portable data collection device of FIG. 1 in which the image capture module is shown not pivoted with respect to the housing of the device.
Figure 3:
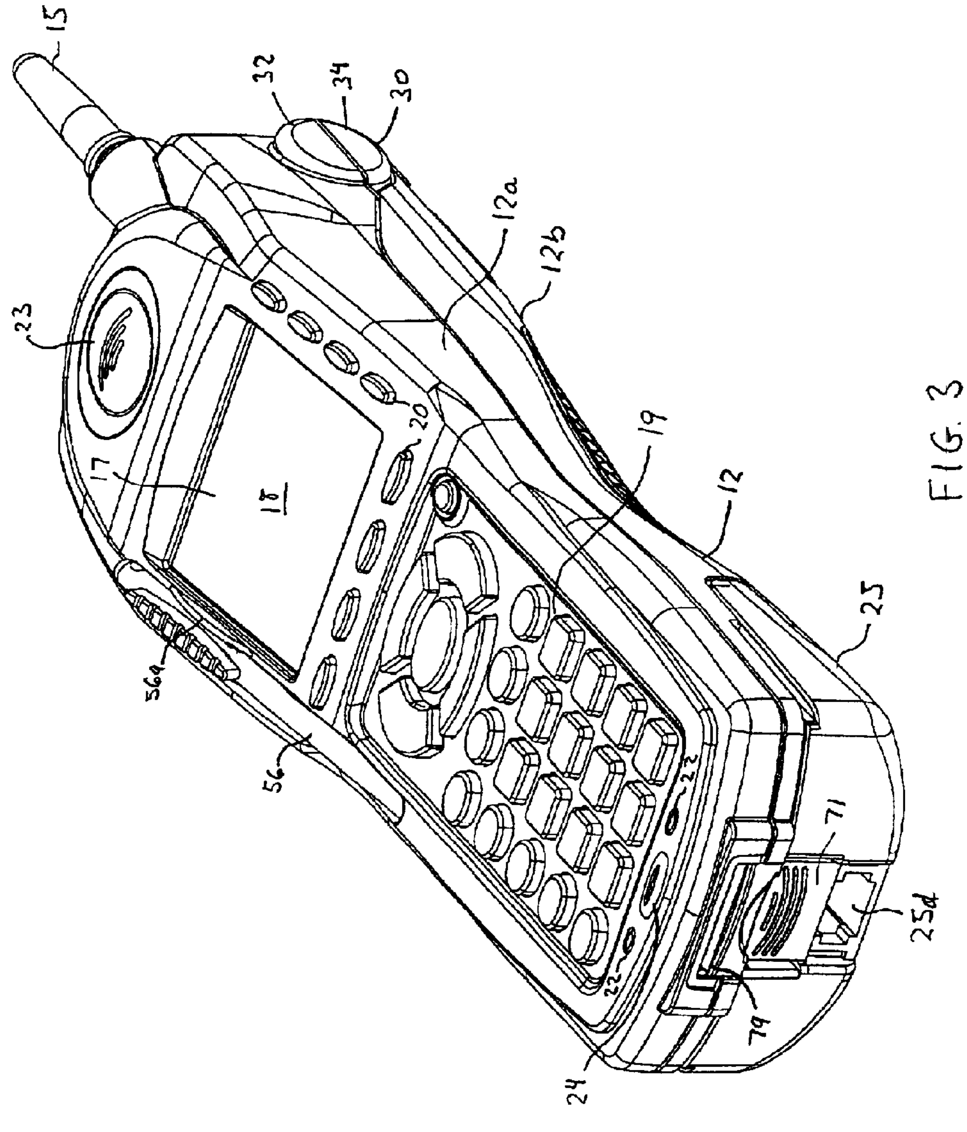
FIG. 3 is a top perspective view of portable data collection device of FIG. 1 showing the user interface of the device.
Figure 4:
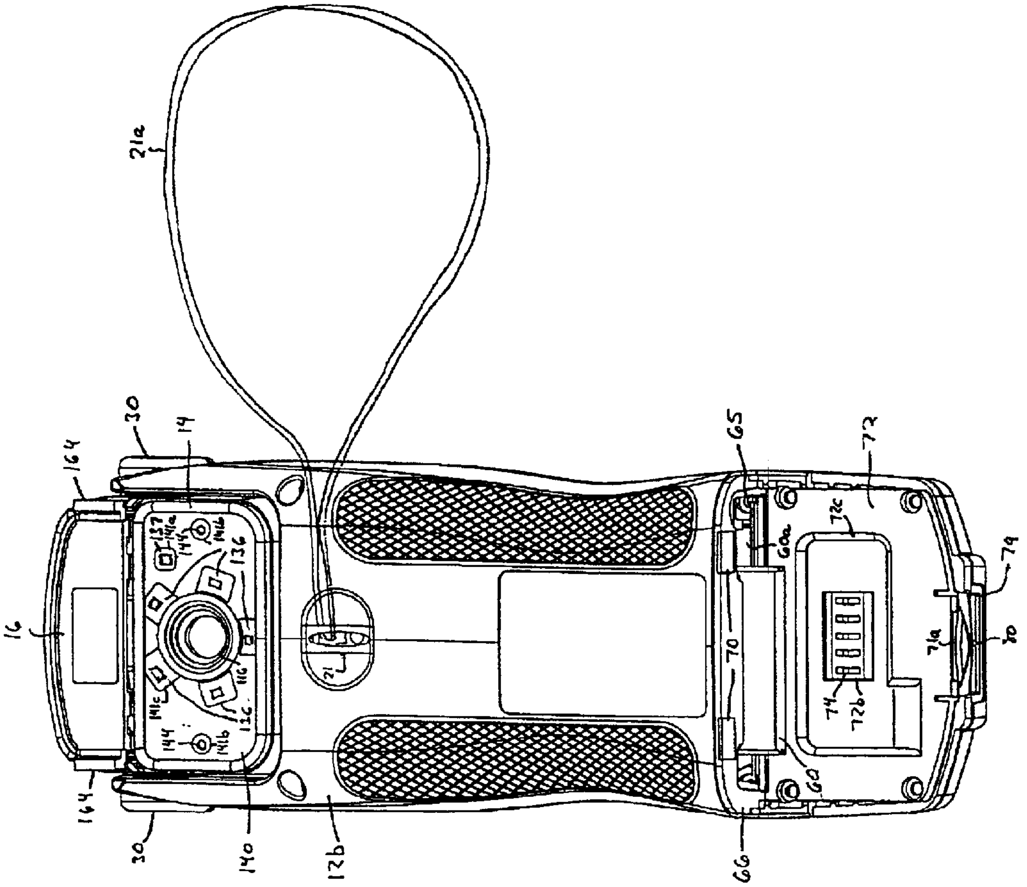
FIG. 4 is a bottom perspective view of portable data collection device of FIG. 1 in which the battery has been removed.
Figure 5:
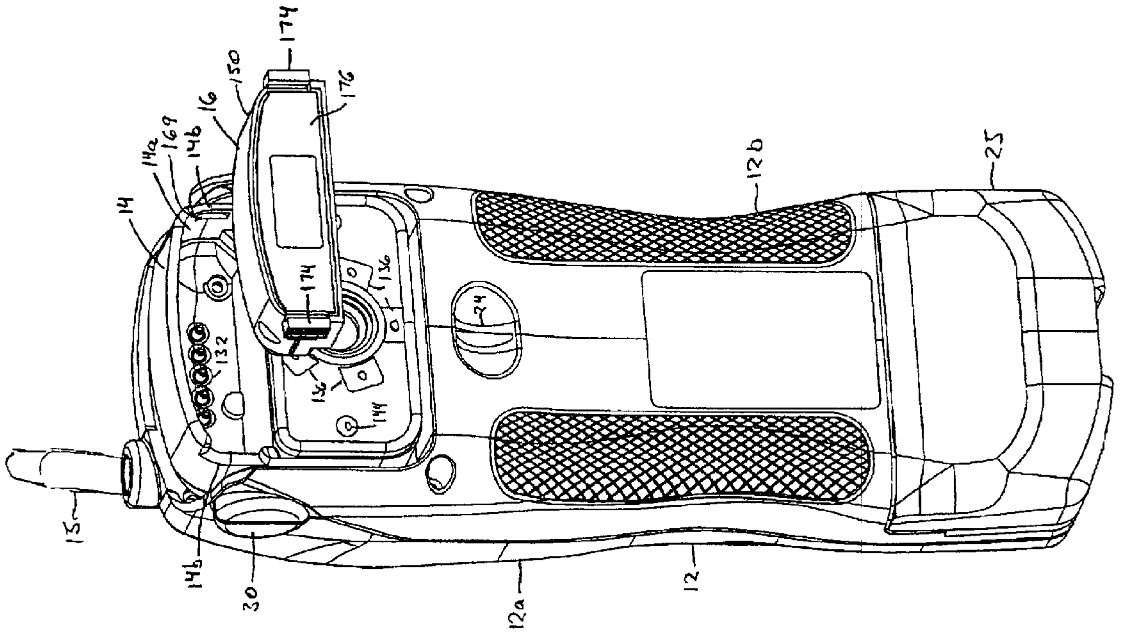
FIG. 5 is another bottom perspective view of the portable data collection device of FIG. 1 showing the flash module removed from the image capture module and the flash module as a separate component.

Referring to FIGS. 1–5, a portable data collection device 10 is shown having a housing 12 which can be hand-held and is of a size and weight, such that it can easily be carried by a person. An image capture module (or unit) 14 is pivotably mounted in housing 12 to provide a range of angular movement for positioning of the module 14 with respect to housing 12. This allows module 14 to swivel the range of 20 degrees to 90 degrees (or approximately 75 degrees) to allow the module to be pointed from directly down to straight ahead while a user holds the housing 12 at a convenient angle. The image capture module 14 includes a detector array 86, optics or lens 107, an automatic focusing mechanism, illuminating light emitting diodes (LED's) 136, a light sensor 137 for automatic exposure, and targeting laser diodes (lasers) 144, as best shown in FIG. 6A. A flash module (or unit) 16 is received in a socket 14*a* (FIG. 5) of image capture module 14, such that it can be replaced with a different flash module providing the same or different illumination wavelength(s). FIGS. 1 and 4 show the flash module 16 received in socket 14*a*, while FIG. 5 shows the flash module 16 removed from the socket 14*a*. In housing 12 of device 10 is a controller, such as a microprocessor, representing part of the control electronics of the device mounted on printed circuit boards which connect to the image capture module 14 to control illumination provided by the flash module 16 for image capture, and to receive and process images from the image capture module 14, including decoding, displaying, transmitting, or storing images. A user interface to the controller is provided on housing 12 and includes a touch screen 17 over a display 18, keypad 19, one or more rows of keys from keypad 20 on sides of display 18. Two LED indicators 22, a speaker 23, and a microphone 24 are also provided which are coupled to the controller. The controller and control electronics are described later in more detail in connection with FIGS. 8–13, along with their interface to electronics in the image capture and illumination modules. Housing 12 further has a replaceable battery 25 which attaches to housing 12, and has an outer casing 25*a* which conforms to the body of device 10. A hook 21 (FIG. 4) may couple device 10 to a wrist strap 21*a* to facilitate carrying by a user. An antenna 15 is provided on housing 12 which is coupled to wireless radio (RF) communication circuitry in device 10.

The battery 25 may be a module consisting of two rechargeable Lithium-Ion cells producing, for example, 2.1 Amp Hours at 7.2 Volts. The battery may be charged either while in device 10 or externally. Battery 25 may contain a Dallas Semiconductor DS2438 Smart Battery Chip which records all input and output current over time as well as measuring battery temperature and voltage to provide an accurate representation of remaining power. This allows a smart charger to charge an exhausted battery in less than two hours. However other types of battery may be used with or without a smart battery chip.

Figure 6:
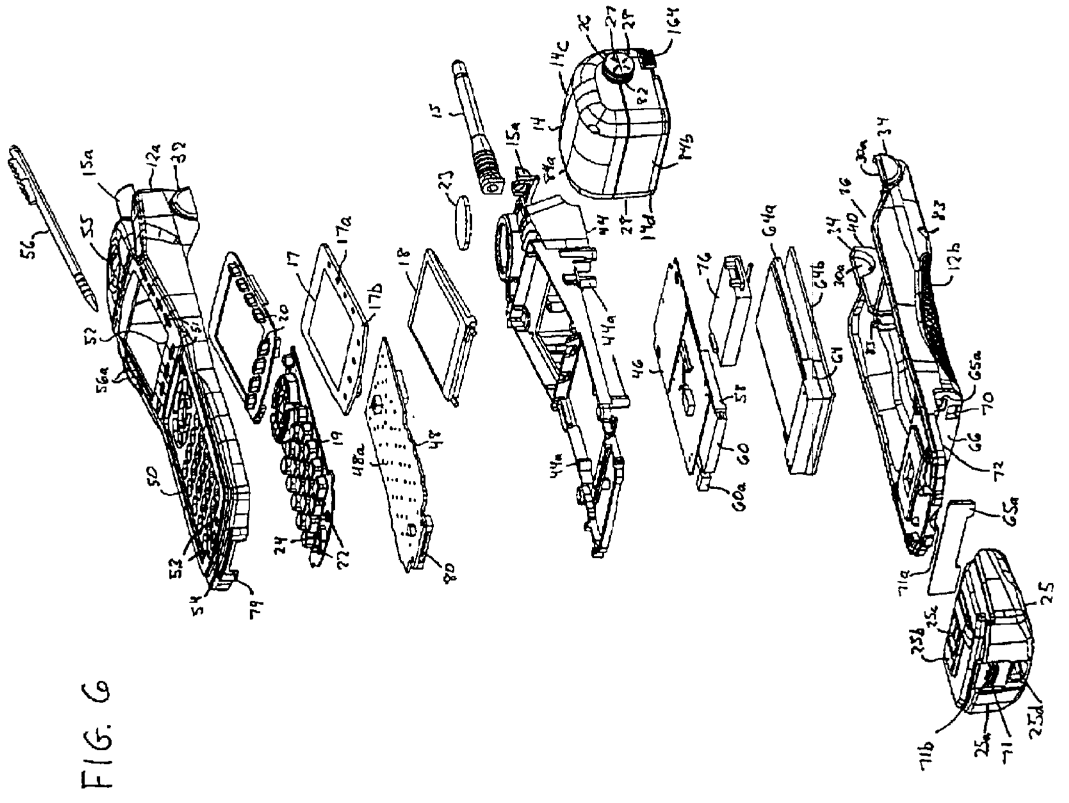
FIG. 6 is an exploded view of the assembly of the portable data collection device of FIG. 1 in which the image capture module is shown assembled.
Figure 6A:
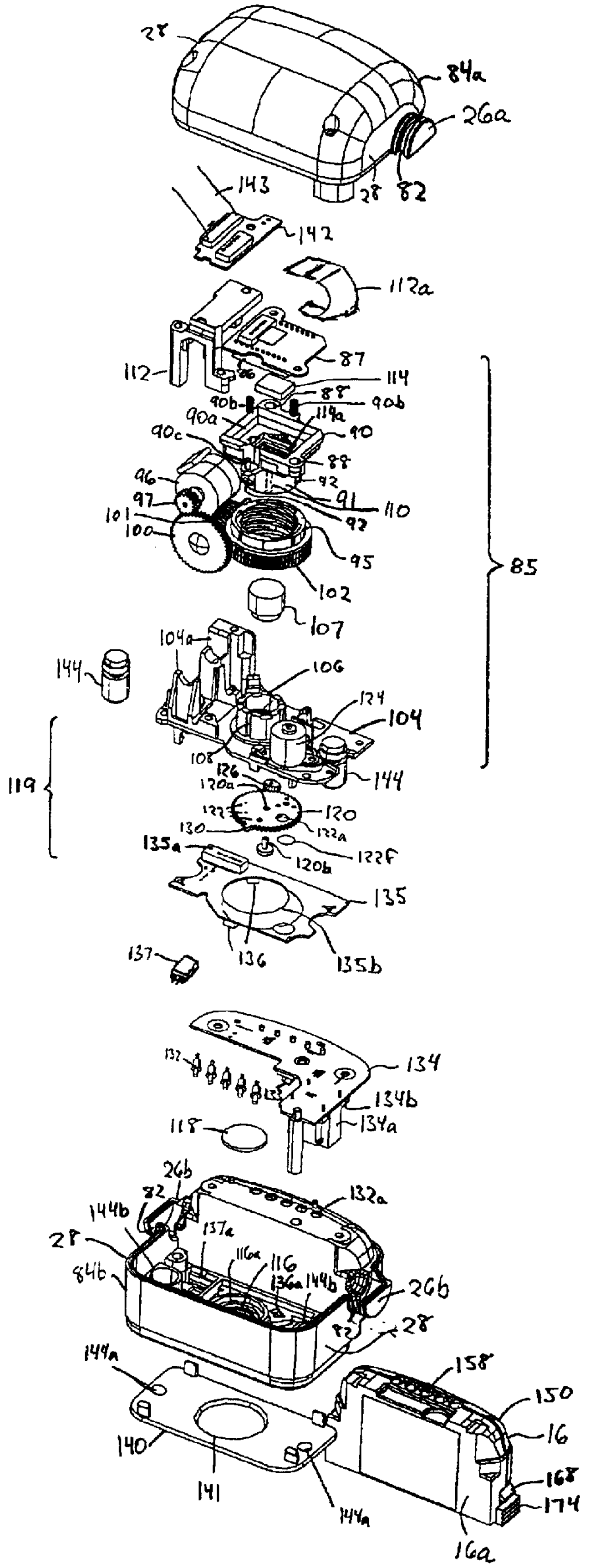
FIG. 6A is an exploded view of the assembly of the image capture module of FIG. 6.

Referring to FIGS. 6 and 6A–6D, the assembly of device 10 will be described. In FIG. 6, the housing 12 has an upper member 12*a* which mates to a lower member 12*b*, and the body of the housing 12 is shaped, such that it can be held in the hand of a user in which lower member 12*b* is saddle shaped, as shown best in FIG. 1, to facilitate holding. The image capture module 14 has two protruding cylindrical members 26 on opposite sides 28 of module 14, which are each received in a pocket 30 (FIGS. 1–5) on each side of housing 12 having an interior shaped to receive the cylindrical member 26. The pockets 30 are formed on each side of housing 12 by the mating of a flange 32 of the upper member 12*a* and a flange 34 of the lower member 12*b*. A cavity 36 is provided inside one end of upper member 12*a* to an opening 40. The back 14*c* of module 14 is located in cavity 36 and the front 14*d* of the module extends through opening 40, such that module 14 can rotate along the pivot formed by protruding members 26 in pockets 30, but can be temporarily held in place by pressure and/or detents 27 between members 26 and pockets 30. Detents 27 represent raised areas radially distributed along circular outer surface 27 of each of pockets 30. These detents are received in corresponding grooves along the interior of circular wall 30*a* of pockets 30, such that multiple temporary locking positions are provided for module 14 as it pivots in housing 12. For example, FIG. 1 illustrates the pivoting of module 14 with respect to housing 12 as indicated by bi-directional arrow 39.

Between upper and lower members 12*a* and 12*b* is an interior bracket 44 to assist in supporting the components in housing 12. Upper and lower members 12*a* and 12*b*, and support bracket 44, may be made of molded plastic. Printed circuit boards 46 and 48 are provided for the control electronics located in housing 12, where the top of circuit board 48 further has pads 48*a* to detect depressing of keys of keypad 19. Upper member 12*a* has openings 50 through which keys of keypad 19 extend, openings 51 through which keys 20 extend, a rectangular opening 52 for display 18, where between display 18 and opening 52 is touch screen 17 having a border area 17*b* with connection to the touch screen and pads 17*a* for detecting depressing of keys of keypad 20. Openings 53 provide viewing of two LED indicator lights 22 coupled to circuit board 48. Further, upper member 12*a* has an opening 54 to microphone 24, and openings 55 to speaker 23. Keypad 20, touch screen 17, display 18 and speaker 23 are supported on molded parts of bracket 44. Display 18 may be an LCD type display, such as a Color TFT. A touch pen or stylus 56 (FIGS. 1 and 2) is held in brackets 56*a* for use with one or more areas of touch screen 17, such as is typical of graphic user interface of a palm type electronic organizer.

A type I or II compact flash socket 58 is provided under printed circuit board 46 for receiving a compact flash card 60. The compact flash card 60 may be similar to that used in typical digital cameras to provide memory for storage of images. A compact flash card ejector 60*a* is to facilitate release of compact flash card 60. Below compact flash socket 58 is an optional internal PCMCIA card slot 64 into which a PCMCIA card 64*a* may be inserted. The PCMCIA card slot 64 and its card 64*a*, if inserted, are accessible when lower member 12*b* of the housing is removed. A PCMCIA card interface board 64*b* to connectors in slot 64 is provided for enabling access to a PCMCIA card 64*a* when in slot 64. PCMCIA card 64*a* may have one or more different application programs. Compact flash socket 58 and ejectors 60*a* are accessible through an opening 65 along surface 66 of lower member 12*b* when battery 25 is removed. For purposes of illustration, FIG. 4 shows the compact flash card 60 partially ejected. A rubber member 65*a* may be provided to plug opening 65 such as to protect internal components of the device, but is removable to access ejector 60*a* and card 60 when needed. Battery 25 has a casing 25*a* having hooks or tabs (not shown) which latch into openings 70*a* of lower member 12*b*, where the base of the battery is hooked by latch 71 under a lip 71*a* (FIG. 4). Opening 72*b* is provided in a recess 72*c* of lower member 12*b* for contacts 74 from printed circuit board 48. Battery 25 has a raised surface 25*b* which matches into the recess 72*c*, such that contact terminals 25*c* of battery 25 connect to contacts 74 to supply power to the device 10. Other battery latching mechanisms, such as typically used in cell or cordless phones, may also be used for battery 28 to housing 12. A connection port 25*d* on battery 25 is provided through which the battery may connect to an AC charger (not shown) to recharge the battery.

The housing 12 further includes a radio unit 76 coupled to an external antenna 15. Radio 76 may be a network based RF radio, short-range RF radio, or a cell phone based RF radio. Antenna 15 is held by brackets 15*a* extending from upper housing member 12*a* and bracket 44. Optionally, an internal antenna may be used instead of antenna 15, or device 10 may be provided without an antenna when no radio 76 is present. I/O (input/output) connectors 80 are provided which are coupled to printed circuit board 48 and accessible via opening 79 in the upper member 12*a* I/O connectors may provide an NTSC video port and/or a USB port, or other serial type port for communication with microprocessor 18*c*, wherein the microprocessor may operate in response to commands or data provided via USB port, or output video systems via NTSC video port. Device 10 may connect via I/O connectors 80 to a external illumination unit, such as a flash, which is triggered by a signal from the control electronics in housing 12. Optionally, an IR (Infrared) transceiver/receiver may be provided for IR communication, such as through a window in housing 12.

A slot 82 is one or both of protruding members 26 is provided such that flexible connection wires such as ribbon cable, couple the electronics of the image capture module 14 and flash module 16 to control electronics on printed circuit boards 46 and 48. The upper and lower members 12*a* and 12*b* of housing 12 are assembled together by screws from lower member 12*b* in holes 83 which extend via molded holes 44*a* in the bracket 44 into threaded holes (not shown) of upper member 12*a*. Although the above assembly of components is described, any other assembly may be used to support such components such as in handheld portable electronics, like cell phones or digital cameras.

Figure 7:
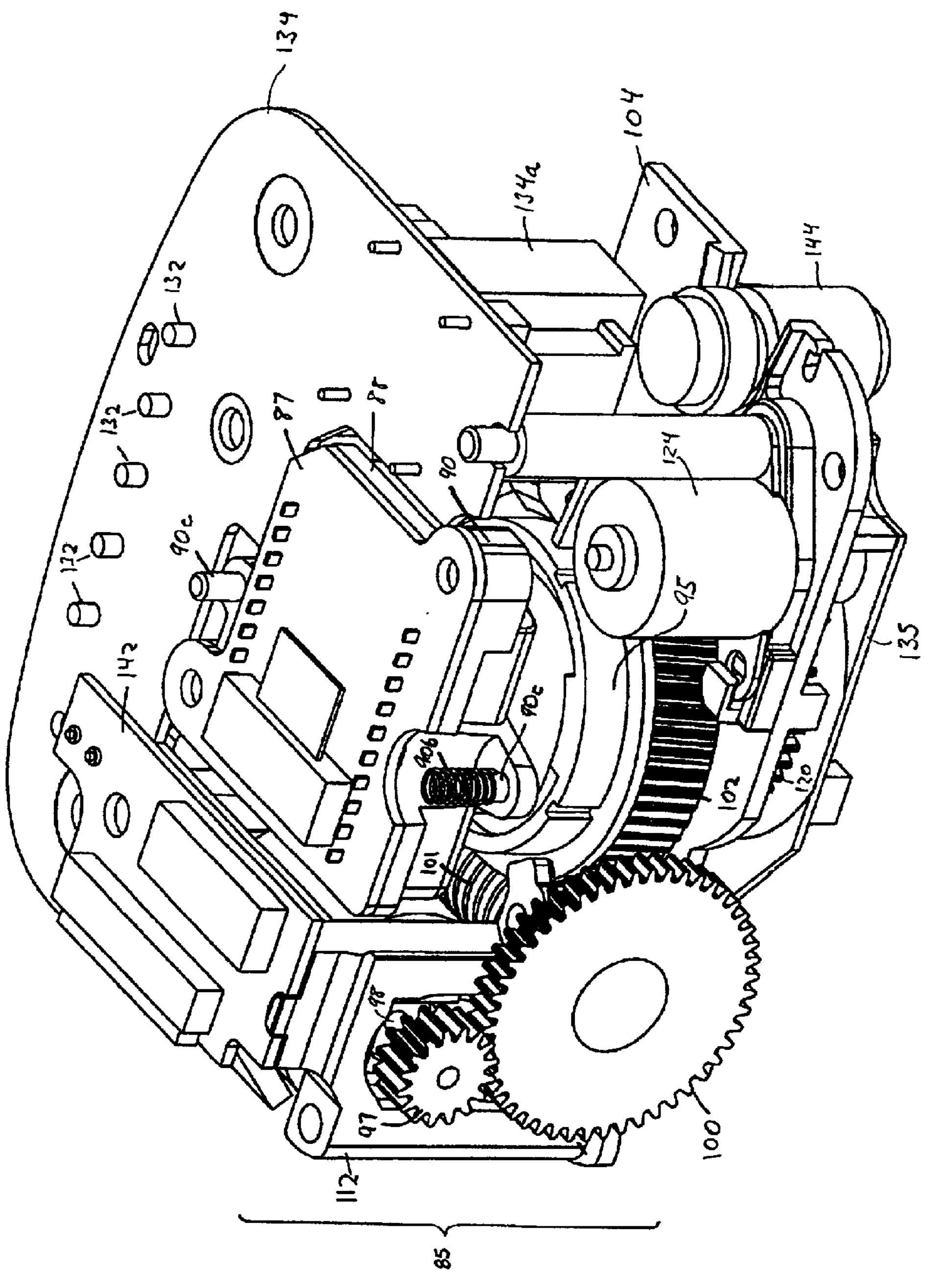
FIG. 7 is a back perspective view of the assembled mechanism of the image capture module of FIG. 6A with the housing of the module removed.

Referring to FIG. 6A, the assembly of the image capture module 14 is shown having a housing provided by an upper housing member 84*a* mated to a lower housing member 84*b*. Detector array 86 is located on a platform 87 which is attached, such as by screws through holes 88, to a detector array carrier 90. Detector array 86 is a color CCD array with sensitivity to a range of wavelengths including the fluorescent wavelength(s) of indicia. The detector array 86 has an electronic shutter which is programmable by the controller of the device 10. For example, detector array 86 may have 1392×1040 colors pixels (1.45 Megapixels), such as a Sony CCD Model No. 1CX205AK. The electronic shutter may be set, for example, to 50 microseconds. A tube 91 extends from carrier 90. Three protrusions (or lobes) 92 along the outer surface of tube 91 are each located in a groove of threaded interior of a barrel cam member 95, such that rotation of the cam member 95 enables the carrier 90 to be advanced or retracted in cam member 95. For purposes of illustration, only two of the three of protrusions 92 are shown in FIG. 6A. Although three protrusions 92 are preferred, more than three may be used. A focus stepper motor 96 has a gear 97 coupled for rotation on the motor's shaft 98 (FIG. 7) and gear 97 engages the teeth of a gear 100 which is coupled to rotate a worm gear 101 (i.e., a threaded shaft). Worm gear 101 engages a helical gear 102 about the outer circumference surface of cam member 95. The helical gear 102 may be molded into the outer rim of cam member 95. Thus, rotation of the focus motor 96 translates motion to cam member 95, via gears 97, 100, and 101, to rotate the cam member 95 clockwise or counterclockwise depending on direction of motor rotation. Gear 100 may be attached to worm gear 101 by a pin extending from gear 101, or gear 100 and gear 101 may a single integrated component. A bracket member 104 has an extending tube 106 having a lens 107 therein. Lens 107 is threaded along its exterior surface such that its may be screwed into the threaded interior of tube 106 to a desired position. Lens 107 provides optics for focusing light onto detector array 86. For example, lens 107 may be 9.9 mm diameter lens, such as available from Sunex Co. of Xian, China, having an entrance pupil of about 3.3 mm, with the angle for the light entrance cone to the lens 107 of about 52 degrees. Vertical slots 108, such as four in number, extend along the length of the outer surface tube 106. A vertical guides or ridges 110, equal in number to slots 108, extend from the interior of tube 91 and can ride along slots 108 of tube 106 to avoid rotation of carrier 90 when cam member 95 is rotated. One of these vertical guides 110 is shown as dashed lines in FIG. 6A. In this manner, a focusing mechanism 85 is provided for changing the focal distance between detector array 86 and focusing optics of lens 107, having a focus motor 96, cam member 95, and gears 97, 100, and 101 to translate motor rotation to cam member 95, and a detector array carrier 90 having a tube 91 with protrusions 92 which rides in cam member 95, in which detector array 86 is located on a platform facing lens 107 of tube 106 which slides along slots 108 in tube 91. Signals from the control electronics in housing 12 to motor 96 activate the motor to move to change the distance between the detector array 86 and optics 107 to enable focusing of an image on the detector array 86, as described later. Focus motor 96 is retained in a motor bracket 104*a* of bracket member 104 and a bracket 112. The assembled focusing mechanism 85 is shown in FIG. 7 with bracket 112 removed for purposes of illustration.

Figure 7A:
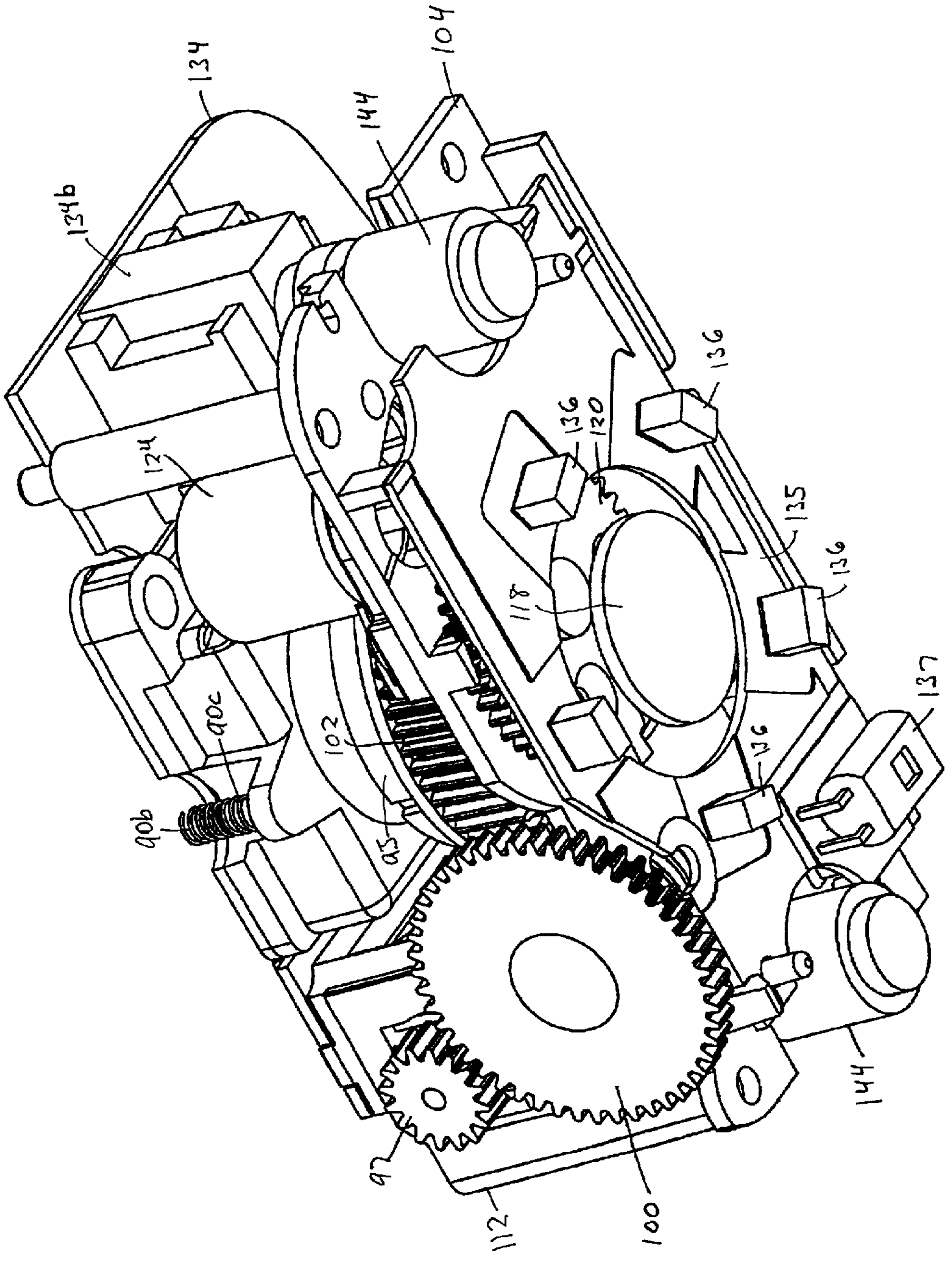
FIG. 7A is front perspective view of the assembled mechanism of the image capture module of FIG. 6A with the housing of the module removed.

Light in image capture module 14 is received onto detector array 86 via an opening 116 in lower member 84*b*, via a window 118 located along a molded ledge 116*a* about opening 116 in lower member 84*b*, through lens 107, tubes 91 and 106, and via a filter 114. Filter 114 represents an anti-aliasing and IR filter located in a recessed ledge 114*a* in the tube 91 in an opening 90*a* of carrier 90 to tube 91 between detector array 86 and lens 107. Two springs 90*b* are each located on a guide pin 90*c* extending from carrier 90, such that when the assembly, as shown in FIGS. 7 and 7A, is received in lower and upper housing members 84*a* and 84*b*, the springs 90*b* lie against surface of the upper housing member 84*a*, such that carrier 90 is biased in a direction toward cam member 95 to stabilize carrier 90, and its detector array 96 when cam member 95 is rotated. In summary, the three protrusions 92 on the barrel cam member 85 keep the detector array 86 on platform 87 stable, and two springs 90*b* keep the three cam followers provided by protrusions 92 in contact with the barrel cam member 95, while vertical guide 110 from the wall of the cam follower tube 91 ride in slots 108 of tube 106 to keep the platform 87 from rotating while it translates in barrel cam member 95. A switch 133 may be mounted on printed circuit board 134 which is actuated when carrier 90 is in its further position of travel from optics 107. The controller can read the signal to reinitialize the stepper motor 96 to a zero position in the focusing mechanism.

In contrast to most digital camera focusing mechanisms which move a lens to focus an image on the film or a detector array, focusing mechanism 85 moves the detector array 86 with respect to a fixed lens 107. This is because in a typical digital or analog camera the lens is external to the camera body and the user can see the lens move in and out while focusing, which can be a problem since any external lens barrel could easily be damaged if the camera were dropped. Although the entire lens and focusing mechanism of a digital camera could be placed within the camera's body with a flush window to allow light to reach the lens, this creates another problem since the window must be large, and if filters are needed they will be larger and more expensive. For example, if the camera is focused at infinity, the lens would be deepest inside the body (closest to the detector array) and therefore a relatively large window in the body is required to encompass the field of view of the lens. Since in image capture module 14 the detector array 86 is moved for focusing, the lens 107 can be fixed at a position closer to the front of module 14 and a protective window 118, such as 12 mm in diameter, is adequate. This makes any filters much less expensive (one quarter of the glass area), if needed outside window 118 along opening 116, and the image capture module 14 has a focusing mechanism which is unobtrusive, as compared to an external lens barrel of most prior art digital cameras.

An adjustable aperture is provided by an iris wheel 120 which is rotatable on pin 120*b* extending from bracket member 104 and received in hole 120*a* of the wheel. The iris wheel 120 has multiple openings 122 which are positionable in the path of the light to detector array 86. Openings 122 are of different diameters to control the amount of light received on the detector array 86. An aperture stepper motor 124 is provided having a shaft coupled to a gear 126 which engages teeth about the outer circumference of wheel 120, such that rotation of the motor's shaft 121 is coupled to iris wheel 120. To assist in initializing the iris wheel position, the motor 124 may be rotated in one direction until a stop 130 located on wheel 120 abuts gear 126, thereby limiting further movement of wheel 120. Thus, by over driving motor 124, the iris wheel is automatically initialized against stop 130, such that signals may be applied to the motor 124, representing steps, of a number which rotate iris wheel 120 to one of openings 122 in the light path to the detector array 86. In addition to openings 122, one position on the iris wheel 120 has no opening, such that it provides a block for light to detector array 86. One of these openings 122 may optionally have a band-pass (or cut-off) filter to pass all fluoresced wavelength (s) of light.

Figure 6B:
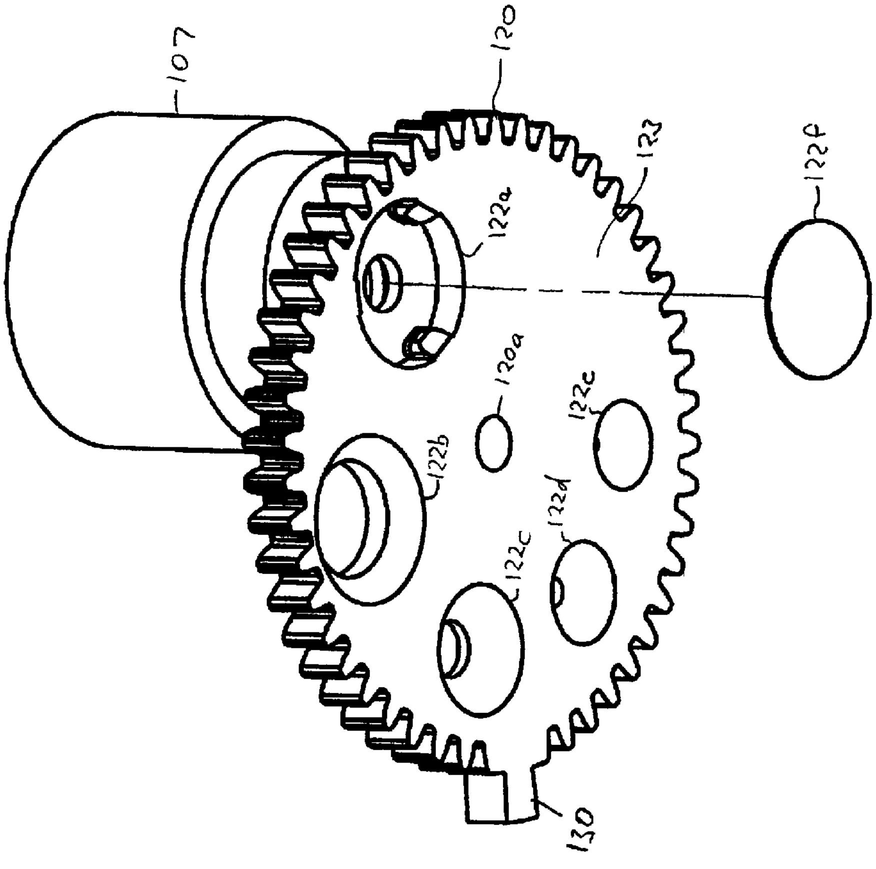
FIG. 6B is a bottom perspective view of the iris wheel and lens of the image capture module of FIG. 6A.

An example of an iris wheel with the optional filter is shown in FIG. 6B, in which six positions are provided: a first position 122*a* has a recessed opening with a ledge upon which optional filter 122*f* is mounted; second, third, fourth, and fifth positions 122*b*, 122*c*, 122*d*, and 122*e* having openings of successively smaller diameters; and a sixth position 123 has no opening to provides a block for light. Openings at positions 122*b–e* may correspond to different F-stop numbers. Aperture motor 122 may be controlled to enable selection of any of these six positions 122*a–e* in the light path in module 14. Although one filter is shown in this example, other positions may similarly be provided with filters, and a different number of openings may be provided of different diameters and/or filters. The iris wheel 120 with stop 130, and motor 122 for translating rotation to wheel 120, via gear 126 coupled to the motor's shaft, represents the aperture control assembly 119 in device 10. One advantage of placing filters in the iris wheel 120 over a conventional multiple leaf iris mechanism used in cameras, in that these filters can easily be moved into and out of the optical path by moving the iris wheel. Thus, to take conventional pictures, an aperture opening is used other than one having a filter for facilitating fluorescence imaging. Optionally, one or more filters may be placed along the optical path, such as outside adjacent window 118 in opening 116. For example, a Schott OG530 or Wratten 12 filter may be used. These filters may cut off any wavelengths shorter than 500 nM, such that detector array 86 cannot see any of the light produced by the flash but can easily see the green yellow and red fluoresced colors.

Flash module 16 has a housing 16*a* shaped to be received in socket 14*a* (FIG. 5), such that recessed contacts 158 align with plunger (pogo) pins 132 which are connected to a printed circuit board 134. Pins 132 are spring biased and compress in response to abutment with contacts 158 via openings 132*a* for each of pins 132. Printed circuit board 134 provides electronics for driving and controlling a flash tube in the flash module 16, which includes a transformer 134*a* for producing the necessary voltages to charge a capacitor coupled to the flash tube. The electronics for driving and controlling the flash tube will be described later below.

Further, five illumination LEDs 136 are mounted on printed circuit board 135 around opening 136*b* of the board, such as in a ring. Other number of LEDs 136 may also be used. The board 135 may have switching transistors which switches the LEDs 136 on or off in which the current powering the LED's 136 is provided through a constant current generator on the board. Printed circuit board 135 receives signals along wires to printed circuit board 134 from the controller in housing 12. A light sensor 137, such as a photocell or photodiode, for detecting ambient light, and two targeting lasers 144 (such as laser diodes, or collumation optics for projecting light from LEDs or other illumination sources) are connected to board 135 each via two-wire cable (not shown). Electronics on circuit board 135 control the operation of targeting lasers 144, and light sensor 137 in response to signals from the controller in housing 12.

Another printed circuit board 142 connects to the detector array 68, via ribbon cable 112*a*. The purpose for printed circuit board 142 is to provide means for connecting wires (discrete wire cables) 143 to cable 112*a*. Wires 143 extend through slot 82 of one of the protrusion members 26 (e.g., the left one of protrusion members 26). The wires 143 are sufficiently flexible to permit rotation of image capture unit 14 in housing 12 while maintaining connection to board 46 (FIG. 6) in housing 12. Also, wires (not shown) extend from board 135 from contacts 135*a*, and from board 134 at contacts 134*b*, which pass through slot 82 of the other one of protrusion members 26 (e.g., the right one of protrusion members 26 in FIG. 6A) to board 46. The upper and lower housing members 84*a* and 84*b* are assembled by screws, such as four screw, in holes 148, two from upper member 84*a* and two through lower member 84*b* into upper member 84*a*. The screws extend through holes in the circuit boards in module 14. Each of the two cylindrical members 26 is formed by two mating halves 26*a* and 26*b* of upper housing member 84*a* and lower housing member 84*b*, respectively. A slot 82 extends through each of cylindrical members 26 and their respective mating halves and wires can extend through slot 82.

The image capture module has a front protective plate 140, which may be of transparent plastic, such as polycarbonate. An opening 141 in plate 140 is provided through which extend annular steps of a molded barrel 116*b* of lower member 84*b* from opening 116. The back surface of plate 140 is coated with black material, e.g., ink, using a mask, so as to form unmasked area 141*a* for light sensor 137, unmasked area 141*b* for targeting lasers 144, and an unmasked areas 141*c* for illumination LED's 136. A front view of the completed image capture module 14 assembly is best shown in FIG. 4. Optionally in each of the unmasked areas 141*b* for targeting lasers 144 is a diffractive or refractive optic, such as a prism, which at least substantially bends the beam of their respective laser 144 to project a spot to define the viewable extent where device 10 can image. When media is located in the field of view, the beams define two sides of the extent of the field in one dimension. This may be useful to avoid imaging of the light from the targeting lasers 144 during image capture on the detector array 86. For example, each of lasers 144 may have a prism 144*a* molded in plate 140 which is polished to provide the desired refraction. Molded insets are provide along the interior surface of lower member 84*b* for different components. For example, lasers 144 may be received in molded inset 144*b*, LED's 136 in molded inset 136*a*, and light sensor 137 in molded inset 137*b*.

Figure 6C:
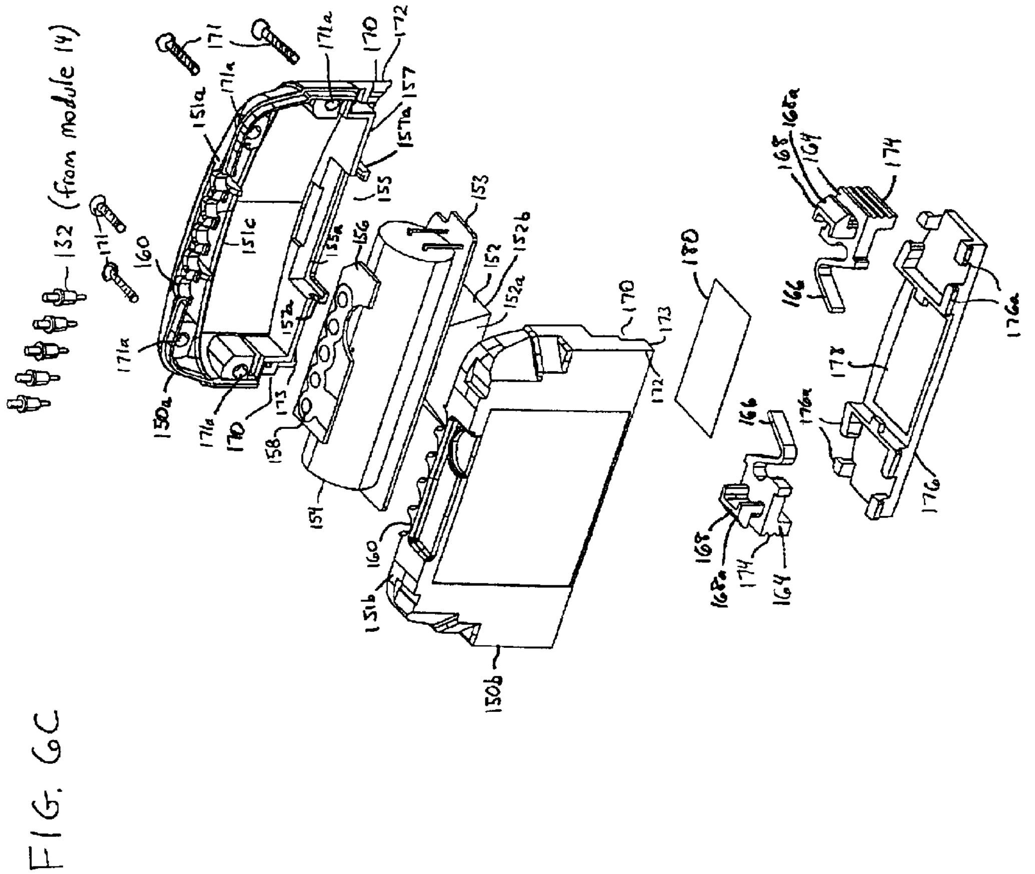
FIG. 6C is an exploded view of the assembly of the flash module of FIG. 6A.
Figure 6D:
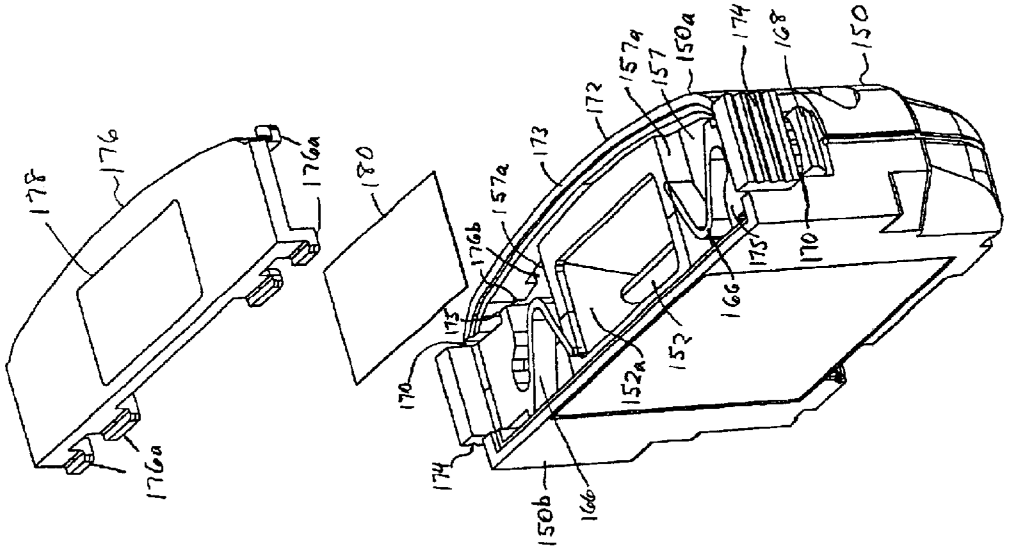
FIG. 6D is a perspective view of the flash module of the data collection device of FIGS. 1 and 2 in which a filter and cover plate are shown removed.

Referring to FIGS. 6C and 6D, the assembly of the flash module 16 is shown with a case of housing 150 having an upper case half 150*a* which mates with a lower case half 150*b*. A flash tube 152 in its reflective casing 152*a* is mounted to a printed circuit board 153 upon which is also mounted a capacitor 154 capable of storing voltage needed to energize flash tube 152. A board 156 provides recessed contact pads 158, which align with openings 160 when half 150*a* and half 150*b* are assembled along their respective back walls 151*a* and 151*b*, to connect circuitry (shown in FIG. 12) in the image capture module 14, in which pads 158 are connected by wires from board 156 to board 153. An inner wall 151*c* may be provided in each half 150*a* and 150*b* to support board 158 against back wall 1*a* and 151*b*. A rectangular opening 155 is provided along the front wall 157 of each half 150*a* and 150*b* into which is received the reflective casing 152*a* of flash tube 152 extending from board 153. The front wall 157 extends to form a raised wall 157*a* on opposite sides of opening 155, while along the inside of front wall 157 provides a ledge 155*a* in each half 150*a* and 150*b* upon which is received the open end 152*b* of reflective casing 152*a*. Halves 150*a* and 150*b* are joined together with threaded screws 171 through threaded holes 171*a* of upper half 150*a* and holes (not shown) in lower half 150*b*, so as to contain capacitor 154, flash tube 152, and boards 153 and 158 therein.

On each side of flash module 16 is an opening 170 to a front surface 157*b* into which is received one of two latches 164. Each latch 164 has a spring 166 abutting front wall 157*a*, and a tongue 168 and button 174 extending through opening 170, as best shown in FIG. 6D. The outer wall 172 of the flash module 16 extends from front surface 157*b* to the front edge 173 of the module, which is discontinuous about openings 170. A cover plate 176 is received inside the outer wall 172 providing a pocket or slot 175 with front surface 157*b* (FIG. 6D) within which each of the latches 164 are located. Cover plate 176 has extending tabs 176*a* which are received in a corresponding grooves or slots 176*b* inside the outer wall near surface 157*a*. The cover plate 176 has an rectangular opening 178. A filter 180 is located over this opening 178 inside the cover plate 176, such that illuminating from the flash tube 152 passes through filter 180 and opening 178. The filter 180 is provided for blocking all light from flash tube 152, but for light needed to excite the fluorescent indicia, and may be used if the flash tube produces light in addition to that needed to excite fluorescent indicia. For example, filter 180 may be a blue Wratten 47B in front of the flash tube 152 which can block any light with wavelengths longer than 500 nanometers (between green and blue). The front cover 176 may be made of a transparent material, such as plastic or polycarbonate. Alternatively, the back surface of cover plate 176 may be coated with black material, e.g., ink, using a mask, so as to form an unmasked rectangular area 178 rather than an opening. Upper and lower case halves 150*a* and 150*b* of the flash module 16, and latches 174, may be made of molded plastic. Another one of flash module 16 may be provide without filter 180 for use in non-fluorescent imaging. FIG. 6D illustrates the flash module 16 as assembled prior to placement of the front cover 176 in which filter 180 is removed.

The assembled flash module 16 is inserted into socket 14*a* of the image capture module 14 as shown in FIG. 5, such that prong pins 132 are received into recessed contacts 158 via openings 160. When flash module 16 is located in socket 14*a*, each of tongues 168 of latches 164 are received into a groove of slot 169 in the sidewalls 14*b* of the interior of socket 14*a*, thereby locking the flash module 16 to the image capture module 14 by the bias or force of spring 166 of each of the latches 164. For purposes of illustration, only one of two grooves 169 is shown. Each of tongues 168 of latches 164 may have a sloped surface 168*a* (FIG. 6C), such that when flash module 14 is first inserted in socket 14*a*, the tongues' sloped surface 168*a* abut the sidewalls 14*b* of socket 14*a* pushing backwards their respective latches 164 against springs 166 until tongues 168 spring forward into their respective grooves 169. To release the flash module 16 from the image capture module 14, a user pushes each of the buttons 174 in while pulling the flash module 16 from socket 14*a*, thus removing tongues 168 from their respective grooves 169. Thus, the flash module 16 is releasably mounted in the image capture module 14 to allow easy replacement with another flash module 16.

The flash tube 152 in flash module 16 may represent, for example, a Xenon Flash. Replaceability of the flash module 16 is useful since the flash tube and the energy storage capacitor 154 that drives the tube may have a lifetime of about 5000 flashes. In a device that uses the flash to illuminate indicia, such as bar codes or fluorescent particles embedded in media, 5000 flashes could occur in a few weeks. One advantage of using a flash tube to illuminate indicia, rather than a continuous source of light such as LED's is that the flash duration may be very short—typically less than 50 microseconds. This short flash (or single strobe of flash tube 152) produces crisp images of indicia, such as one or two-dimensional bar codes or patterns, or a particle density, even when the user does not hold device 10 steady. Since the information may be in the width of the bars of imaged indicia or the density of imaged fluorescent particles, the image should contain clearly defined edges or illuminated particles for decoding. Another advantage of using a removable module is that it can be changed for use with flash modules providing different wavelengths of light. Alternatively, the flash tube 152 and capacitor 154 could be replaced by multiple LED's of the desired wavelength(s).

Figure 8:
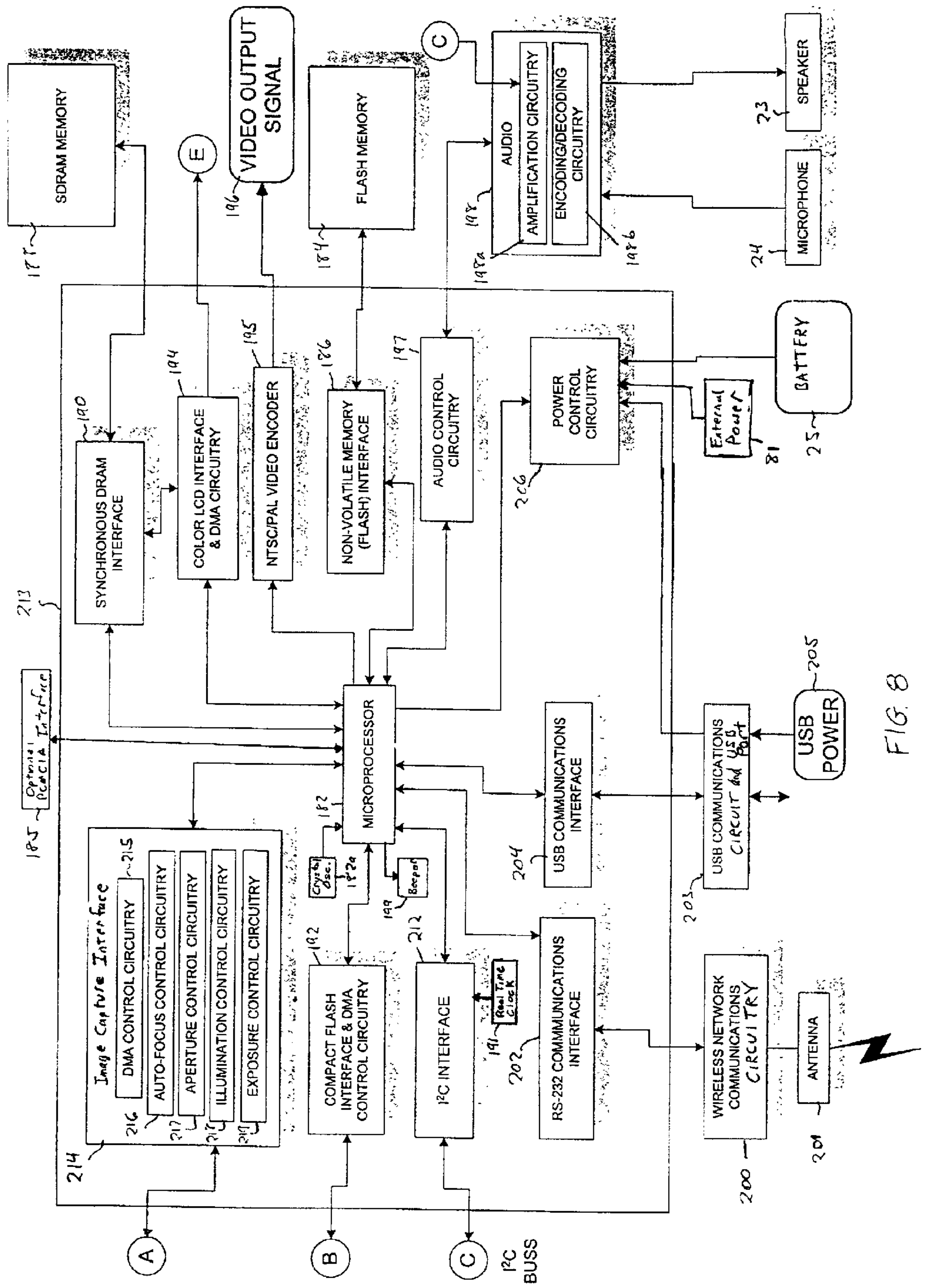
FIGS. 8, 9, and 10 are connected block diagrams of the portable data collection device in accordance with the present invention, where
Figure 9:
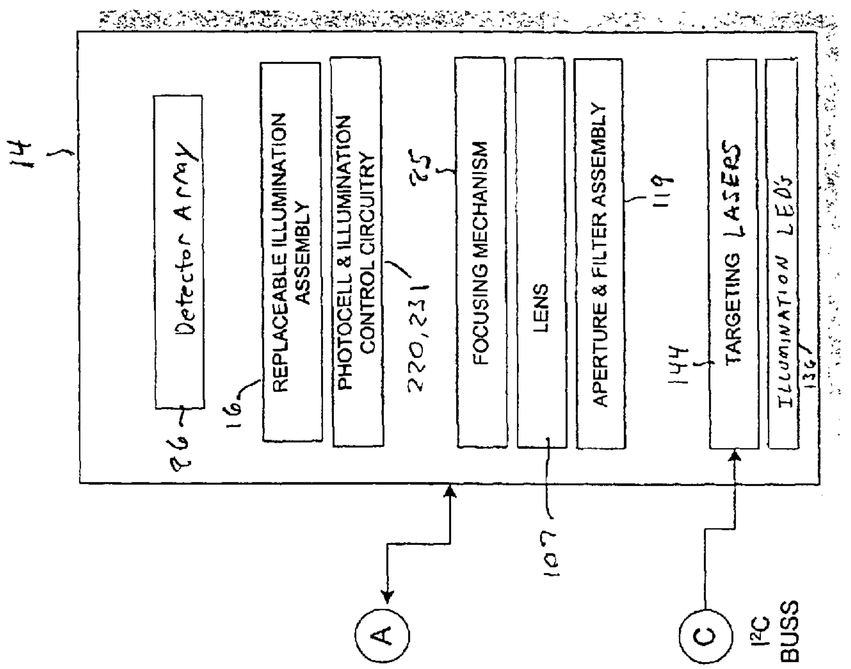
Figure 10:
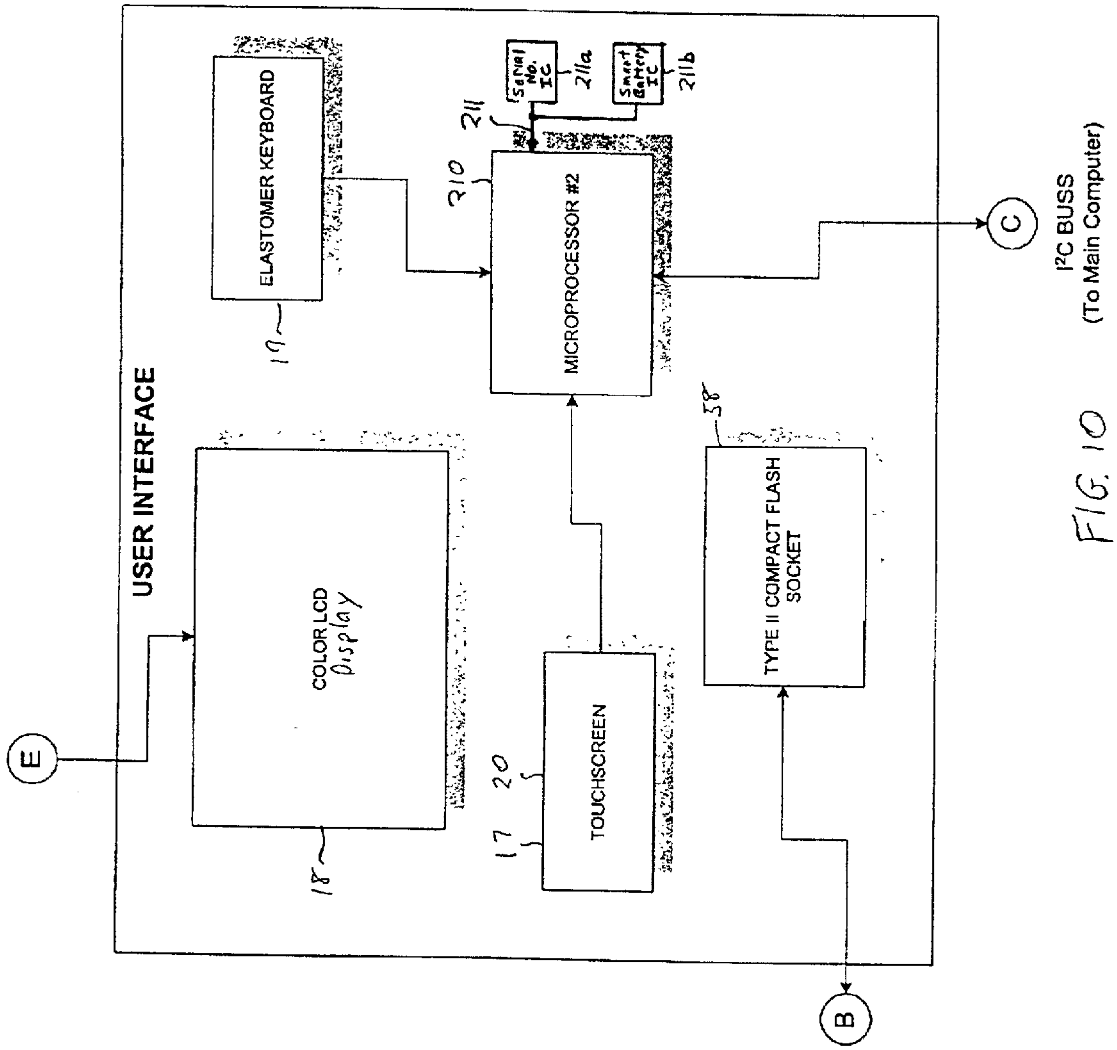

Referring to FIGS. 8–10, a connected block diagram of device 10 and its control electronics is shown having a microprocessor 182 providing the controller which controls the operation of device 10 in accordance with software program stored in memory, such as flash memory 184. Connections between FIGS. 8–10 are shown by circled letters. Microprocessor 182 can access (read/write) to Flash memory 184, via non-volatile memory (flash) interface 186, and access (read/write) to SDRAM memory 188, via a synchronous DRAM interface 190 which controls timing to the SDRAM memory 188. Upon startup of device 10, the operation system (such as ATI Nucleus or Windows CE), and one or more application programs, are transferred from flash memory 184 to SDRAM memory 188 through microprocessor 182 and interfaces 186 and 190, and the operating system is executed by the microprocessor from SDRAM memory 188 along with one or more application programs (such as an imaging and storing digital images application program, and an imaging and decoding fluorescent indicia application program, which operate in response to keys 19 or 20 or areas of touchscreen 18). Microprocessor may be a CPU in accordance with ARM7 architecture of ARM Ltd. of the United Kingdom. Flash memory 184 may represent one or more Flash memory chips. For example, Flash memory 184 may represent a FLASH chip having a combination of ROM and EEPROM memory. Optionally, a PCMCIA interface 185 enables access by the microprocessor 182 to memory of the PCMCIA card 64*a* located in slot 64, which may contain one or more application programs that can be executed by the microprocessor 182. Microprocessor 182 can also access (read/write) to a compact flash card when loaded in Type I or II compact flash socket 58, via a compact flash interface and DMA control circuitry 192, for storage and retrieval of images from the compact flash card, as typical of a digital camera.

Microprocessor 182 can output images (stills or video) for display by color LCD display 18, via color LCD interface and DMA (direct memory access) circuitry 194 from either synchronous SDRAM 188, via the synchronous DRAM interface 190, or from microprocessor 182 for images from the detector array 86 processed by microprocessor 182, or from a compact flash card. Color LCD interface and DMA (direct memory access) circuitry 193 reads image data stored in SDRAM, or memory (e.g., temporary buffer) of microprocessor 182, and formats it for output to the color LCD 18. NTSC or PAL video encoder 195 similarly reads image data and formats it into a video output signal to a NTSC or PAL port on I/O connectors 80, such that the user can optionally connect the device to a video monitor, as typical of digital cameras. NTSC represents the U.S. standard for video signals, while PAL represents the European standard for video signals. Microprocessor 182 may also send audio data to, or receive audio data from, audio control circuitry 197 which connects to audio block 198 providing amplification and encoding/decoding circuitry 198*a* and 198*b*, respectively. Audio output data may represent data stored in memory, such as SDRAM memory, which is decoded (digital to analog) and then amplified to a speaker 23, while audio input data can be received from microphone 24 and encoded (analog to digital) into audio input data for storage in memory, such as SDRAM memory, for playback by the user. A beeper 199, such as a piezobeeper, is provide on board 146 and connected to microprocessor 182, in which the microprocessor may activate the beeper to inform the user when imaged indicia is successfully or unsuccessfully decoded.

Device 10 may have a wireless (RF) network communication circuitry 200, which represents radio unit 76 of FIG. 6, such as a short-range radio operating on the Blue Tooth protocol, a LAN or WAN RF radio, or a cell phone radio, coupled to an antenna 201, and interfaced via an RS-232 communication interface 202 to microprocessor 182. Microprocessor 182 may utilize the audio data output path to speaker 23 and audio data input path from microphone 24, to operate device 10 as a voice-based wireless communication device in conjunction with radio unit 76. The microprocessor may also send and receive data via a USB (Universal Serial Bus) communication circuit 203, having a USB port at I/O connectors 80, via USB communication interface 204, or other type of serial communication link which may similarly be used. Since USB connections provide power, device 10 may use power 205 supplied via the USB port of the USB communication circuit 203. Power control circuitry 206 switches between power received from battery 25, external DC power 81, or via USB port 203. For example, power control circuitry 206 may be provided by an IC chip, such as manufactured by International Rectifier Inc., model number IRF7555. The microprocessor is coupled to the power control circuitry to control on/off/standby state of device 10 via keys or touchscreen of the user interface 15, or to enter a low power consumption state when the device 10 is not in use for a period of time by powering down. Optionally, IR communication may be received by microprocessor 182 via a communications interface to communications circuitry having an IR transceiver/receiver. A real time clock 191 provides a source of time to microprocessor 182. Onboard clocks are provided to clock data transferred between digital components. Microprocessor 182 may provide such clocks in accordance with the output signals of a crystal oscillator 182*a*, but other common digital clocking means, such as an IC timer, may also be used.

A host computer may be coupled to device 10 via one of the I/O connectors 80, such as USB or via radio unit 76, to enable communication with microprocessor 182 which operates interactively with the host computer in response to received commands and data. The host computer may also download an application program via microprocessor 182 for storage in FLASH memory 184 to replace an existing application program or add a further application program in memory of device 10.

An $I^2C$ interface 212 is provided which represent an inter-IC communication hardware/protocol of a two-wire (data and clock) bus between IC's. A second microprocessor 210 (FIG. 10) is provided which receives input data from user interface 15, i.e., keys of keypad 19 or 20 from touchscreen 17. Microprocessors 182 and 210 communicate with each other via an $I^2C$ interface 212. The microprocessor 210 formats user input data into packets with proper addressing for microprocessor 182, such that the program(s) operating on microprocessor 182 can operate responsive to such user data. In addition, a one-wire bus 211 connects microprocessor 210 to a serial number chip 211*a* that has a unique, permanently burned-in serial number, such as 64 bits long, identifying each different one of devices 10. Also, the one-wire bus 211 connects to a smart battery IC 211*b* for providing information about the battery 25, as described earlier. Microprocessor 182 may query microprocessor 210 to read the serial number or obtain battery information, such as in response to a command from a host computer. A real-time clock 199 is connected to $I^2C$ interface 212 to provide a source of time and date information to microprocessor 182. Such time and date information may be used for output to display 18, tagging files, or other stored information in memory. The photocell trip point, speaker volume, LCD contrast and LCD brightness may be controlled with digital potentiometers which are adjustable by the user via user interface 15. The potentiometers remember their settings in memory of the device when turned off. All potentiometer settings, keystrokes, battery data and serial number may be read or controlled from a host computer via an IC bus through I/O connector 80.

An image capture interface 214 is provided in housing 12 to the image capture unit 14. DMA (direct memory access) control circuitry 215 represents typical circuitry for enabling fast transfer of each color image captured by detector array 86 to the microprocessor 186, as commonly used in digital cameras. The digitization of the CCD detector array 86 may occur in image capture module 14, or by circuitry on printed circuit board 46 or 48 in housing 12. In the case of a detector array 86 providing 10 bit resolution for each pixel in each color channels R G B, the microprocessor 182 uses the lower (or most significant) 8 bits in receiving, processing and storing images. Auto-focus control circuitry 216 represents a driver for controlling focus motor 96 of focusing mechanism 85. This driver may be an IC chip similar such as used to control step motors in a typical 3½inch disk drives of computers. For example, the driver may be a double h-bridge IC chip available from ROHM, Inc. model BA6845FS. The microprocessor 182 may provide an enable line and two motor control lines to this driver. The enable line enables the driver, while the two control lines provide control signals to the driver which has logic to operate the motor 96 in one of a forward step or a reverse step. The driver provides a current to the drive motor's windings when its enable line is high in a direction (either a forward step or a reverse step) in accordance with the states (high or low) of each of the two control lines. For example, if the state of the two control lines are low and high, respectively, this directs the driver to provide a signal to the motor 96 to advance forward one step, and if the state of the two lines are high and low respectively, this directs the driver to provide a signal to the motor 96 to reverse one step. The rate of toggling of these two control lines sets the rate of the motor. The step size is fixed. Aperture control circuitry 217 represents a similar driver for the aperture motor 124 to iris wheel 120 which receives a separate enable line, but the same two control lines as auto-focus control circuitry 216. Thus, microprocessor 182 by setting high one of the enable lines to the aperture control circuitry 217 or the auto-focus control circuitry, and the other to low, selects one of the drivers of the aperture motor 124 or focus motor 96, respectively, where the control lines direct the operation of the particular motor. Illumination control circuitry 218 represents the photocell circuit 120 of FIG. 11, which is described below for determining the duration of illumination of flash 152. Exposure control circuitry 219 represent typical electronics common to digital cameras to reset the electronic shutters (integrators) of the detector array 86 and to set the electronic shutter (exposure) time, under control by microprocessor. Thus, enabling microprocessor 182 to interface and control the detector array 86.

FIG. 9 shows a block diagram of the image capture module 14 having the detector array 86, lens 107, focusing mechanism 85, aperture and filter assembly 119, and flash module 16, as described earlier. Photocell and illumination control circuitry represent photocell (auto exposure) circuit 220 and illumination control circuit 231, which are described below in connection with FIGS. 11 and 12, respectively. Flash module 16 further includes flash circuit 237 described below in connection with FIG. 13. Thus, microprocessor 182 via image capture interface 214, can reset the detector array, select the array's integration time, actuate the focus motor 96 of focusing mechanism 85 or the aperture motor 124 of the iris wheel 120 to move in a desired direction or to a position, and signals, as described below, to circuits 220 and 231, and to circuit 237 of the flash module 16 when present in the image capture module. The $I^2C$ interface 212 further communicates with the controller on the printed circuit board 135 for the targeting lasers 144 to enable or disable, and set brightness.

Except for components 23, 24, 25, 81, 182*a*, 185, 196, 199, 200, 201 and 205, all the components in FIG. 8 may represent separate IC chips on printed circuit boards 46 and 48. Although two circuit boards 46 and 48 are described, they are electronically connected for passage of signals, power and ground, and may be provided alternatively on a single board. The components in block 213 of FIG. 8 may be provided on an ASIC located on printed circuit board 46, such as available for digital cameras from SoundVision, Inc. For example, all components in block 213 are provided on a single ASIC, but for DMA control circuitry 215 and IRDA communication interface 209 which are separate IC chips.

Figure 11:
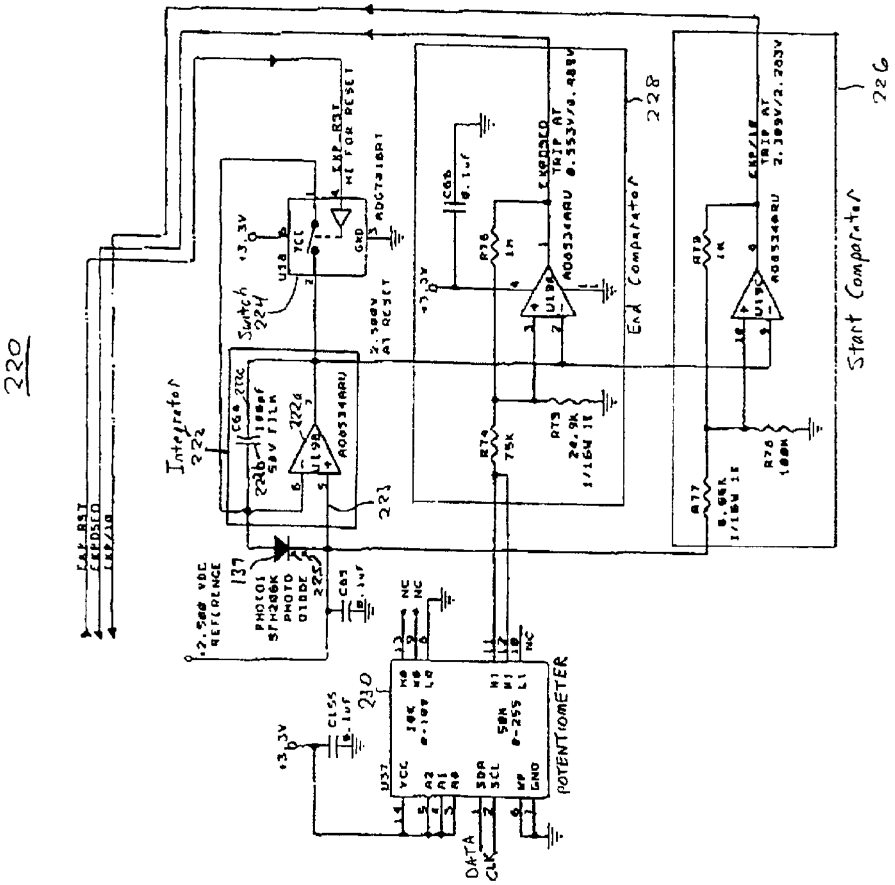
FIG. 11 is a schematic diagram of the photocell circuit of FIG. 9.

Referring to FIG. 11, the photocell circuit 220 is shown having the photodiode 137 connected across an integrator 222 provided by an op amp 222*a* and a capacitor 222*b*. A switch 224 when closed, shorts the integrator 222 and thereby resets its voltage on capacitor 222*b* to 2.5V. When switch 224 opened, the voltage on the left side 222*c* of capacitor 222*b* discharges (decays) in which the op amp 222*a* forces the discharge to be linear. Light on the photodiode 137 is thus integrated and voltage on line 223 to the op amp 22*a* decays from 2.5V proportionally to the amount of light 225 falling upon the photodiode 137. To control the state of switch 224, microprocessor 182 sends a signals on line labeled EXP_RST which when high resets the exposure circuit 220 by charging the integrator 222 to Vcc, and when low, enables its discharge path through the photodiode 137. During discharge of the integrator 222, a start digital comparator 226 is provided which compares the voltage on the integrator 222 with a trip point set to, for example, about 10% of Vcc, or about 2.309V. When the voltage falls below this trip point, a signal from comparator 226 along line labeled EXP/10 to microprocessor 182 changes from low to high. Also during discharge of the integrator 222, an end digital comparator 228 is provided which compares the voltage on the integrator 22 with a trip point set to, for example, about 0.553V. When the voltage falls below the trip point of comparator 228, a signal from comparator 226 along line labeled EXPOSED to microprocessor 182 changes from low to high. Thus, the microprocessor after changing the state on EXP_RST from high to low, resetting the integrator, measures the time between when the EXP/10 and EXPOSED changes from low to high, and this time corresponds to the amount of ambient light falling on photo diode 137. A digital potentiometer 230 is coupled to the positive input of comparator 228 to change the resistance of the respective input, and thereby set the trip point of comparator 228. For example, the resistance provided by the potentiometer 230 may be 24 Kohms. The comparators 226 and 228 are connected to integrator 222, at line 223, and thus receive the decaying voltage from integrator 222 through resistors (and potentiometer 234 for comparator 228) providing a voltage divider to their positive inputs which set their respective trip points. The microprocessor 182 is coupled to the DATA line of the potentiometer 230 to set the resistance of the potentiometer. CLK line represents one or more timing signals from clocks provided in the electronics of device 10. One advantage of using the potentiometer 230 is that it enables flexibility, such as during manufacture, to provide a trip point for comparator 228 for a particular device 10. Optionally, the potentiometer 230 may be substituted with a fixed resistor.

The photocell allows measurement of ambient light for controlling flash auto exposure. The photocell may have a sensitivity curve similar to the human eye. As will be described below, the photocell circuit and software adjustable comparator trip point, allows an IGBT transistor 240 in the flash module 14 to be shut off when exactly enough light has been provided by the flash for proper exposure. It may also operate properly when fill-in flash is used in combination with ambient light as may be selected via user interface 15.

Figure 12:
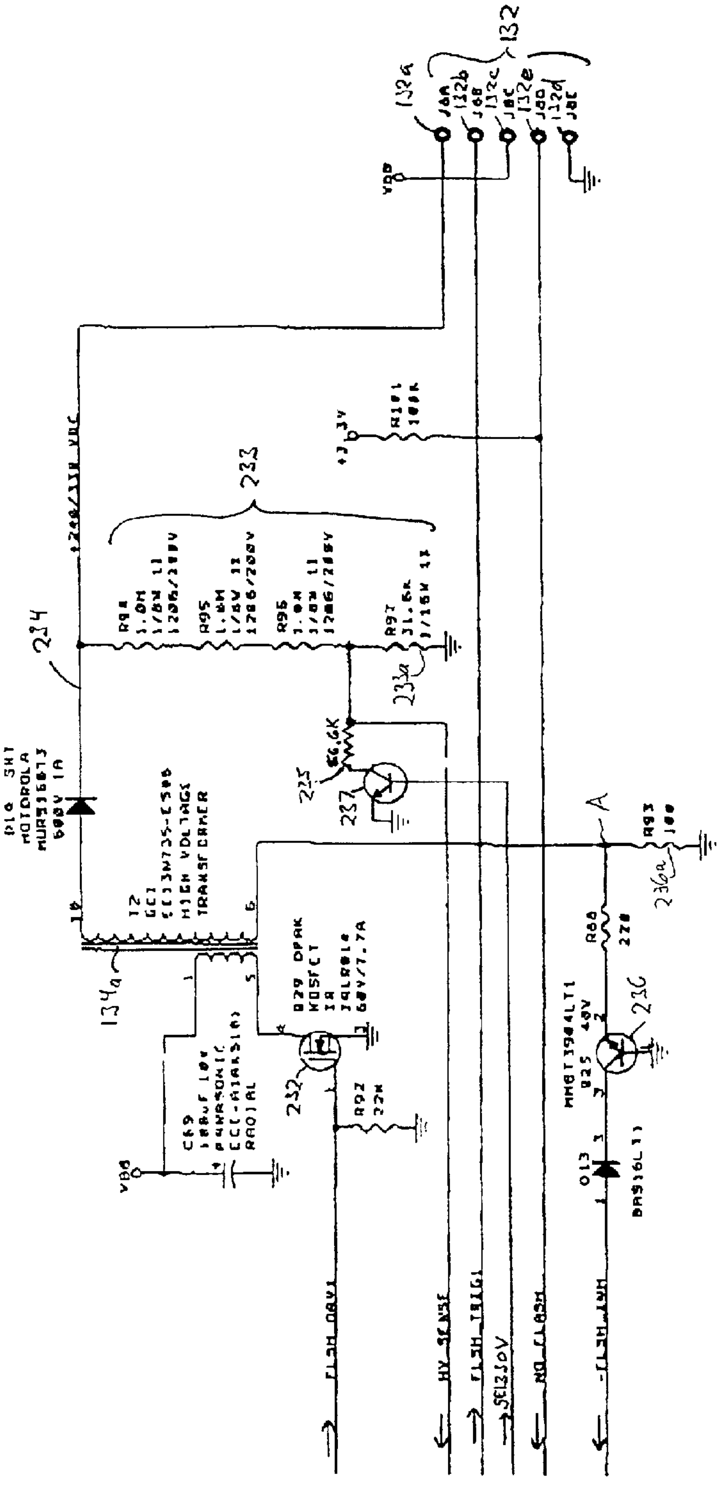
FIG. 12 is a schematic diagram of the charging circuit for the flash module of FIG. 9.

Referring to FIG. 12, the charging circuit 231 in the image capture module 14 is shown for charging capacitor 154 (FIG. 13) via plunger pins 132. The microprocessor 182 modulates the FLASH_DRV1 line signal to MOSFET 232 which is connected in series with transformer 134*a*, until the voltage necessary to operate the flash tube builds on line 234. This signal FLASH_DRV1 represents a series of 10 microsecond pulses, in which each successive pulse does not start until the microprocessor 182 receives a high signal on line —FLSH_INH indicating that a negative voltage is no longer present on the secondary coupling of transformer 134*a* (i.e., current no longer flowing to charge capacitor 154). When current flows from ground through resistor 236*a* to the secondary coupling of transformer 134*a*, the capacitor 154 is charging (i.e., the voltage on line 234 pumps up on capacitor 154 in FIG. 13), also at that time, transistor 236 is on thereby asserting the —FLSH_INH line coupled to transistor 236 to low (i.e., setting the line to ground). When the current no longer is present, the transistor 236 turns off, and the —FLSH_INH line changes to high informing the microprocessor 182 to send the next pulse on FLASH_DRV1. The user can select, via user interface 15, one of two voltage ranges for operating the flash tube 152 of flash module 16. Via a signal from microprocessor 182 along line SEL330V, the voltage on line 234 may be selected to be one of between 230V–240V, when line SEL330V is low, or between 320V–330V, when line SEL330V is high. The state of line SEL330V changes the resistance of a voltage divider coupled to line 234, which is tapped by line HV_SENSE to measure the voltage on line 234. When SEL330V line is high, transistor 237 turns on thereby adding resistor 235 to the resistor 233*a* of divider 233, such that when line 234 is at about 320–V330V, about 2.5 V is sensed on line HV_SENSE. When SEL330V line is low, transistor 237 turns off removing resistor 235 from the divider 233, such that when line 234 is at about 230V240V, about 2.5 V is sensed on line HV_SENSE. This line HV_SENSE is coupled to a digital comparator (not shown) which compares the HV_SENSE voltage to a reference voltage, i.e., 2.5V, such that the microprocessor 182 can detect when the voltage on line 234 has reached the proper level to cease the FLSH_DRV1 signal modulation. Depending on the desired reference voltage, other voltages than 2.5V may be used depending on the resistors of voltage divider 233. Although the signal FLASH_DRV1 is described as a series of 10 microsecond pulses, other pulses of a different short duration may be used.

Figure 13:
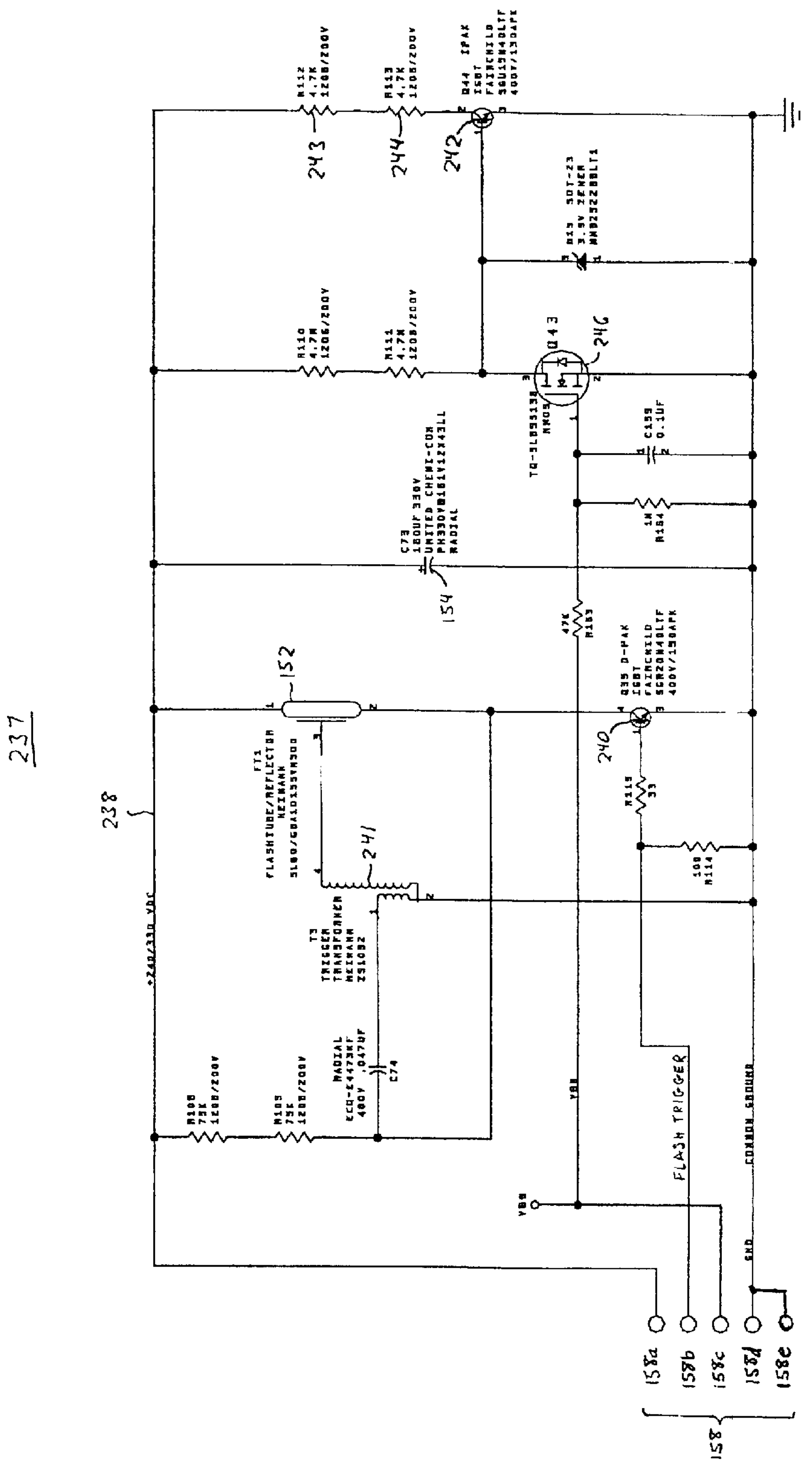
FIG. 13 is a schematic diagram of the flash circuitry in the flash module of FIG. 9.

Referring to FIG. 13, the flash circuit 237 on printed circuit board 153 (FIG. 6C) in the flash module is shown having the flash tube 152 in parallel with capacitor 154 in which four pins 132, labeled 132*a–d*, of the image capture module 14 connects to four pads 158, labeled 158*a–d*, on the flash module 16. The voltage on line 234 (FIG. 12) to line 238 charges capacitor 154, via connection of pin 132*a* to pad 158*a*. To control illumination, a FLSH_TRIG1 line (FIG. 12) is provided from microprocessor 182 to the base of IGBT (Insulated Gate Bipolar) transistor 240, via a connection of pin 132*b* to pad 158*b*. When FLSH_TRIG1 is high, transistor 240 turns on providing a discharge path for capacitor 154 through flash tube 152 to enable illumination from flash tube 152. A trigger transformer 241 provides the potential (voltage) needed to ionize the gas in the flash tube 152. When FLSH_TRIG1 is low, transistor 240 turns off and the flash tube ceases to provide illumination.

To enable safe handling of the flash module 16 when removed from image capture module 14, a discharge path for capacitor 154 is provided from an IGBT transistor 242 over resistors 243 and 244. Transistor 242 may be replaced by an SCR (Silicon Controlled Rectifier) without the zenor diode, or other electronic switches, such as a relay or contact switch, may be used. Normally, when the flash module is located in the image capture module, Vbb (battery voltage) is provided via pin 132*c* to pad 158*c* to transistor 246. This maintains on tansistor 246 and off transistor 242 coupled to the gate of the transistor. When the flash module is removed from module 14, Vbb to pad 158*c* is no longer present thereby turning transistor 246 off which turns on transistor 242. Any voltage of capacitor 154 discharges over resistors 243 and 244 through transistor 242. Thus, the module 16 may be manually handled without the possibility of electric shock by any charge left on capacitor 154. Other connection of pin 132*d* to pad 158*d* provides ground to the flash circuit. The microprocessor 182 detects when flash module 16 is present in the image capture module 14 when the signal on NO_FLASH line from pin 132*e* is high (FIG. 12). When flash module 16 is properly in the image capture module 14, the signal on NO_FLASH is low since pin 132*e* is grounded, via its connection to pad 158*e*, which is shorted to ground by connection to pad 158*d*.

The values and components shown in FIGS. 11–13 are exemplary, and other components or different values may be used to provide similar function. Thus, via electronics on printed circuit board 156 (FIG. 6C), and electronics on printed circuit board 134 (FIG. 6A) coupled to board 156 by contacts 132, the transistor 240 in series with the flash tube 152, and transistor 242, to safely dump the high voltage from the capacitor 154 if the module 16 is removed while capacitor 154 is charging or charged. The transistor 240 response to change in state of FLSH_TRIG1 from high to low further enables the flash tube 152 to be quenched before the capacitor 154 is fully discharged to auto flash exposure.

In operation, microprocessor 182 actively controls in software the auto-focusing mechanism 85 to achieve proper focal distance between the detector array 86 and optics 107 to enable a proper focused image on the detector array. The microprocessor 182 analyses the green pixels of a rectangular window (e.g., 32 by 32 pixels) in the center of each image frame, provided in a Bayer pattern, from the detector array to determine a rate of change value. (A Bayer imaging pattern provides more green pixels than red or blue pixels, and is often used in digital imaging since it more accurately reflects the human eye perception of color.) The higher the rate of change, the sharper the detail of the image. The microprocessor 182 calculates histograms of the green pixel values (each pixel having a value of 0 to 255) in each row of the window, and histograms of the green pixels in each column of the window. For each histogram, the highest non-zero pixel value and lowest non-zero pixel value is determined, and used to normalize the histogram to 0 to 255 scale. For example, if a histogram has 220 and 10 as its highest and lowest pixel values, respectively, then the histogram is normalized such that 220 becomes 255 and 10 becomes 0, and pixel values between 220 and 10 are changed to values proportional between 255 and 0. In the row histograms, the frequency value of each pixel value are summed together to provide a first sum. In the column histograms, the frequency value of each pixel value are summed together to provide a second sum. The lower of the first and second sums become the rate of change value for a particular image frame. The microprocessor 182 compares this rate of change value to the previous rate of change value calculated from the previous image frame. The microprocessor directs the focus motor 96 of the focusing mechanism 85, via auto-focus control circuitry 216, to move in steps either increasing or decreasing the focal distance to obtain a higher rate of change value, and thus provides a control (servo) loop as the motor will advance or retract the detector array with respect to focusing optics until the image is in proper focus. In other words, if the current rate of change is greater than the previous rate of change, the microprocessor directs the focusing motor to continue to move one step in the same direction as its last movement, while if the current rate of change is less than the previous rate of change, the microprocessor directs the focusing motor to change one step in the opposite direction than its last movement. If the difference between the rate of change values of two successive frames is not more than a predefined percentage from each other, the focusing motor 96 is not moved and focal distance is maintained. For example, this percentage may be ±5%, however other percentage values may be used. However, if the focusing motor 96 has not been moved by the microprocessor for a time period, such as 50 millisecond, the microprocessor directs the focusing motor 96 to move one step in a direction opposite to the last movement. The microprocessor has software timers, in which one of these software timers represents a focus timer which resets to zero each time the focusing motor is instructed to move. Other auto focusing methods such as used in typical digital or analog cameras having auto focusing capability may also be used by microprocessor 182 to determine the proper focal distance between the detector array or film and focusing optics. On start up of device 10, or periodically, the focusing motor 96 is reinitialized to a zero position by driving the motor to move carrier 90 until switch 133 sends a signal to microprocessor 182 indicating that it has been actuated.

To operate device 10, the user directs the image capture module 14 such that the desired image is provided in real-time on the display 18. This may be facilitated by pivoting the image capture module while housing 12 is held. If the image displayed represents media having fluoresce indicia, such as a one or two dimensional barcode, or other dataform, the user presses a decode key on keypad 19 or 20 (or a location of touch screen 17) to instruct the microprocessor 182 to capture and decode the fluorescent indicia in the image. Such fluorescent indicia, represent symbols, bars, density, or other encoded indicia, printed on media with one or more of three types of fluorescent ink that fluoresce as either red, yellow or green. The ink fluoresces when exposed to deep blue or ultra violet light from the flash illumination. A "good" or "bad" beep sound from beeper 199 may signify if the indicia code has been read correctly. Each of LED indicators 22 may similarly be used to indicate successful or unsuccessful decode in which each LED indicator is of a different color, e.g., red or green. If the user desires to capture the image on the display 18 for storage in memory of the device, such as in a file on the compact flash card, the user presses the shutter release key on keypad 19 or 20 (or a location of touch screen 17) to instruct the microprocessor 182 to capture and store the image in a file on the compact flash card (or optionally in SDRAM memory). In this manner, device 10 may operate similar to a typical digital camera.

When the user presses the decode key, the microprocessor 182 sends a high signal on the FLSH_TRIG 1 (flash trigger) line to the flash circuit 237, via the charging circuit 231, to start illumination by flash tube 152 of the flash module 16, a low signal on EXP_RST (exposure reset) line to start the integrator discharging through photo sensor 137, and signal to the detector array 86 to reset. If the optional band-pass (or cut-off) filter is present in the iris wheel 12, the microprocessor 182 in addition to the above signals sent to start exposure may also send a signal to the aperture motor 124 to position iris wheel 12 to an opening having the filter in the light path to the detection array, via aperture control circuit 217. When the microprocessor 182 detects a change in the state (low to high) of the EXPOSED (exposure) signal from the photocell circuit 220, it changes the state (high to low) on the FLSH_TRIG 1 line to cease illumination by flash tube 152. The flash is thus automatically quenched at the proper time thereby enabling automatic flash exposure. The captured image of the fluorescent indicia is then transferred into SDRAM memory 188 from the detector array 86 for decoding. Any typical decoding algorithm may be used depending on the type of indicia imaged. For example, for a barcode, the widths of the bars and/or spaces between bars is decoded into a number. Since, the indicia imaged has color information, color may be used as a feature for decoding. For example, color bar code decoding is described in U.S. Pat. Nos. 5,714,745, and 5,869,828. Further, if the indicia imaged represents a density of fluorescent particles, such density is read and decoded. The decoded information may be displayed to the user on display 18 and stored in SDRAM memory 188. If the device 10 is coupled to a host computer (not shown), such as via I/O connectors 80, the decoded information may also be sent to the host computer. Optionally, the signals to start illumination and reset the detector array may be delayed until the EXP/10 line from the automatic exposure circuit changes from low to high, indicating the start time for measuring the amount of light to the photo sensor.

For example, the exposure (integration) time for the detector array 86 is set to 50 microseconds, but may be other values, so that sufficient light is received on the detector array for imaging and decoding. The exposure should be short enough to prevent any ambient light (including sunlight) from exposing the image. Preferably, exposure time is less than the 500 microsecond CCD array exposure of the prior art dataform reader of U.S. Pat. No. 6,123,263. However, the fluoresced colors from the bright flash are intense enough to easily expose an image. The result is a black background with an image of bright colored bars which can easily be decoded.

When the user presses the shutter release key, the next image received by the microprocessor 186 from the detector array is processed into a JPEG image, or other typical compressed image format, and transferred to a file for storage on the compact flash card, and/or transmitted to the host, if present.

Optionally during imaging, the microprocessor 182 provides signals to automatically set the aperture of the iris wheel 120 to an opening having a diameter having the proper F-Stop for imaging on the detector array 86 in accordance with the amount of ambient light. The microprocessor periodically sends a reset signal to the photocell circuit 220 to reset the integrator for the photo sensor, and then calculates an exposure time value between the time EXP/10 signal and the EXPOSED signals are received from the photocell circuit 220. A software timer is used by the microprocessor 182 to measure the exposure time value.

This software timer is started when EXP/10 signal is received and stopped when the EXPOSED signal is received. This time value is then associated with a F-stop position of a diameter opening on the iris wheel 120 using a look up table in SDRAM memory, and the aperture motor 124 is then directed by the microprocessor 182 to move from its current position a number of steps to the look up table position in the light path to detector array 86.

The user may be provided, via user interface 15, with a graphical user interface to control parameters of operation of device 10. The graphics user interface may be similar to a typical digital camera in which one or more screen menus enable the user to select parameters of operation. This may include reviewing images from the compact flash card, such as in a typical digital camera. For example, if an automatic setting of the aperture is not provided, the user may select the aperture of the iris wheel having the proper F-stop opening. The user may also select to use the targeting lasers 144, rather than, or in combination with, the display 18, to target indicia, and the brightness of the indicia. The microprocessor 182 can switch on the targeting laser 144 via a pulse width modulated signal to the targeting laser's interface on the board 135 in the image capture module 14. For example, the targeting lasers may be powered via a MOSFET operating in accordance with the pulse width modulator signal in which the duration of the pulse width determines the brightness of the targeting lasers. If diffractive or refractive optics are provided with the targeting lasers, the beam from the targeting lasers 144 define the width of the field of view of the image. While without such optics, the targeting lasers 144 provides two spot beams in the field of view of the optics and detector array, and thus during fluorescent imaging by the detector arrays LED's 144 are turned off by microprocessor 182. Usually, the display is used to aim the image capture module, but the color LCD display requires that its CCFL backlight always be on. This backlight requires about one watt of power and if the display can be turned off, such as to a standby mode after a duration of non-use, the battery may last considerably longer.

In low light situations, the user can select, via user interface 15, to turn on the illumination LEDs 136 to provide light for automatic focusing, such as described above, or turn off the illumination LED's 136, as needed. The microprocessor 182 in response switches on or off the illumination LEDs, by sending signals to the illumination LED's interface on the board 135 in the image capture module 14. Optionally, the illumination LED's may automatically be turned on or off based on the amount of light measured by the photo sensor. Illumination LED's 136 can also be used to illuminate indicia instead of using the flash module 16 for non-fluorescent indicia. Illumination LED's 136 may also be used to reduce "red eye". When a flash that is close to the lens is used to illuminate a picture containing people or animals, eyes appear red as the flash illuminates the retina which is visible through a large diameter pupil. If the LED's 136 are flashed just before a picture is taken, the pupils become smaller as a reaction to the bright light and "red eye" is reduced. Pre-firing the flash will also reduce "red eye".

To protect the detector array from damage, such as due to direct sunlight, when the photocell circuit 220 detects an amount of light above a predetermined threshold, the microprocessor 182 may automatically move the iris wheel 120 to position 123 to block light to the detector array 86.

The user may replace the flash module 16 enabling fluorescent illumination with another flash module for non-fluorescent illumination, i.e., module 16 assembled without filter 180. Flash module 16 may be replaced by the user when it no longer provides sufficient illumination. Device 10 may also be operated for capturing images of non-fluorescent indicia and decoding such indicia, or capturing and storing digital images, by either turning off or removing flash module 16 from module 14, or by using a flash module 16 providing non-fluorescent illumination.

Figure 14:
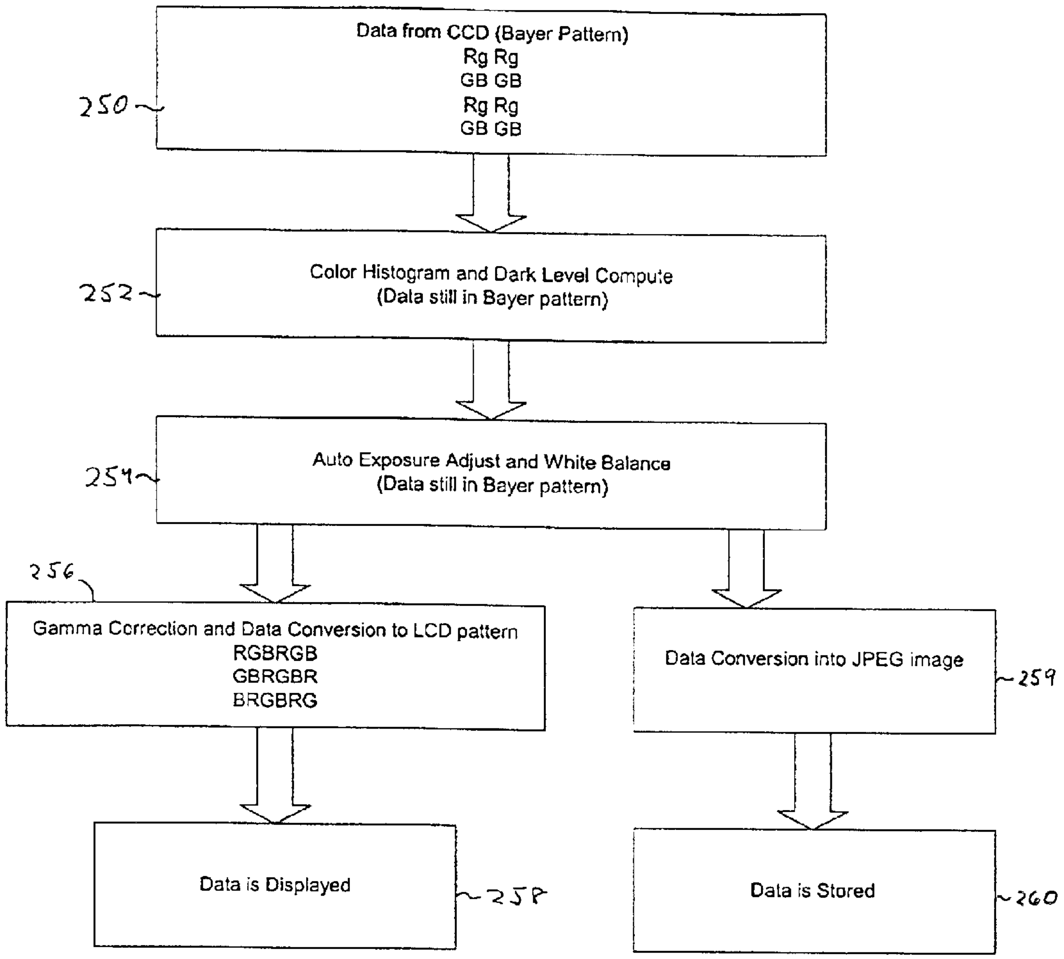
FIG. 14 is a flow chart showing the process of operating upon the data of a captured image by the detector array of the image capture module of the data collection device of the present invention for output to the display of the device.

The processing of images captured by the microprocessor 182 and displayed on the display 18 is similar to that provided in a typical digital camera as illustrated in FIG. 14. For each image frame, data is provided to the microprocessor from the DMA control circuitry in a Bayer Pattern, defining the R G B pixel elements in the image frame (step 250). At step 252, the microprocessor calculates a color histogram of the image frame representing a histogram of the pixel values in each of the three color channels R G B, and the lowest non-zero pixel value is determined in each color channel to provide the dark level for the image. In each color channel, the lowest non-zero pixel value becomes 0 and all the pixel values are level shifted downward respectively. Next at step 254, using the three histograms, the brightness of the image is determined, thereby locating the average intensity level of the pixels, and the exposure (integration time) of the detector array 86 is adjusted upwards or downwards until the brightness reaches a desired level. Also, the white pixels are identified and their values adjusted to provide white color. The resulting color image data from step 254 is then gamma corrected to account for non-linearity of color displayed by the display 18, and the data is converted into a data formatted into a pattern in accordance with the display 18. If the image is to be stored, the image color data from step 284 is compressed into a desired file format, such as JPEG, (step 259) and stored in the compact flash card (step 260). The processes of steps 252–260 are common in digital cameras, thus a detailed explanation of these steps provided in software of microprocessor 182 has not been provided.

From the foregoing description, it will be apparent that there has been provided an improved portable data collection device capable of operating as a fluorescent indicia reader or as a digital color camera. Variations and modifications in the herein described portable data collection device in accordance with the invention will undoubtedly suggest themselves to those skilled in the art. Accordingly, the foregoing description should be taken as illustrative and not in a limiting sense.

What is claimed is:

1. A portable data collection device for reading fluorescent indicia comprising:

a housing;

an image capture module in said housing having an aperture, optics, and a detector for capturing images from light received through said aperture and focused by said optics onto said detector;

a flash for providing light having one or more excitation wavelengths capable of fluorescing said indicia;

a display on said housing capable of viewing captured fluorescent images;

means for operating said flash to fluoresce said indicia, in which said detector receives light at one or more fluoresced wavelengths representing an image of said indicia; and a sensor for measuring light, in which said means for operating said flash further comprises means for providing light from said flash for a duration in accordance with the measured light to provide proper exposure of the image by said detector.

2. The portable data collection device of claim 1 wherein said flash is part of a module removably mounted to said image capture module.

3. The portable data collection device of claim 1 wherein said detector is movable with respect to said optics, and said portable data collection device further comprises means for automatically focusing said image of said detector by moving said detector to a position where said image is focused by said optics on said detector.

4. The portable data collection device of claim 1 wherein said detector represents a color CCD array.

5. The portable data collection device of claim 1 wherein said aperture further comprises means for one of controlling the amount of light received by said detector or filtering said light to pass the wavelengths of the fluoresced indicia.

6. The portable data collection device of claim 1 wherein said image capture module is mounted for pivotable movement in said housing.

7. The portable data collection device of claim 6 wherein said image capture module is pivotable in said housing in the range of 20 degrees to 90 degrees.

8. The portable data collection device of claim 1 wherein said operating means is provided by a controller which further provides means for decoding said indicia in said image received by said detector.

9. The portable data collection device of claim 8 further comprising memory for storing a program in which said controller operates in accordance with said program to control the operation of said data collection device.

10. The portable data collection device of claim 9 further comprising means for providing from a host computer a different one of said program in said memory for operating said controller.

11. The portable data collection device of claim 1 wherein said operating means is provided by a controller which further provides means for operating said image capture module as a digital camera for capturing images and displaying captured images on said display, and memory for storing captured images.

12. The portable data collection device of claim 1 further comprising one or more sources for providing illumination for targeting the indicia for imaging separate from said flash.

13. The portable data collection device of claim 12 further comprising means for bending the illumination from said sources to define the imagible extent of said detector.

14. The portable data collection device of claim 1 wherein captured images of said indicia are provided to said display for use in targeting the indicia.

15. The portable data collection device of claim 1 wherein said flash is part of a flash module comprising a flash tube capable of providing illumination having one or more excitation wavelengths for said indicia.

16. The portable data collection device of claim 1 further comprising one or more sources for providing illumination separate from said flash.

17. The portable data collection device of claim 16 wherein said sources are light emitting diodes provided in a ring on said housing.

18. The portable data collection device of claim 1 wherein said flash is part of a flash module removably mounted in said image capture module, and said flash module comprises a flash tube and a capacitor coupled to said flash tube for powering said flash module, wherein said flash module has means for discharging said capacitor when said flash module is removed from said image capture module.

19. The portable data collection device of claim 1 further comprising means for decoding said indicia to provide data representative of said indicia.

20. The portable data collection device of claim 1 wherein said indicia represents one of a barcode, density, pattern, symbol, or graphic.

21. The portable data collection device of claim 1 wherein said flash provides a single strobe of illumination for each captured image of indicia.

22. A system for reading fluorescent indicia comprising:

a housing;

an image capture module mounted in said housing for pivotal movement and having a two-dimensional detector and a fixed lens for focusing light onto said detector, in which said detector is located on a platform movable with respect to said lens to focus an image onto said detector;

a wheel for providing multiple openings of different diameter, and a filter for passing fluoresced light of the spectra of the indicia;

a flash module removable from said image capture module having a source of ultraviolet light, in which said image capture module has a socket into which said flash module is received, and said ultraviolet light is of one or more excitation wavelengths of the indicia;

a light sensor mounted in said housing; and a controller for controlling a duration of a single strobe of said light source in response to an amount of light received by said light sensor, determining a distance between said detector and said lens for focusing said image onto said detector, receiving images from said detector representing fluorescent indicia illuminated by said ultraviolet light in a single strobe of said light source, and decoding said indicia to provide data representative of said indicia.

23. The system according to claim 22 further comprising a display for receiving images from said detector to aim said image capture module at said indicia.

24. The system according to claim 22 further comprising one or more light sources for providing visible light for aiming said imaging capture module at indicia.

25. The system according to claim 22 further comprising a user interface for enabling the user to control the operation of said controller.

26. The system according to claim 22 further comprising one or more visible light sources selectably enabled by said controller in a low ambient light environment.

* * * * *